(12) United States Patent
Li et al.

(10) Patent No.: US 10,218,640 B2
(45) Date of Patent: Feb. 26, 2019

(54) METHOD AND APPARATUS FOR CONTROLLING DATA TRANSMISSION

(71) Applicant: Huawei Technologies Co., Ltd., Shenzhen, Guangdong (CN)

(72) Inventors: Yunbo Li, Shenzhen (CN); Tianyu Wu, Shenzhen (CN); Xun Yang, Shenzhen (CN); Hui Han, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 768 days.

(21) Appl. No.: 14/542,332

(22) Filed: Nov. 14, 2014

(65) Prior Publication Data

US 2015/0071304 A1    Mar. 12, 2015

Related U.S. Application Data

(63) Continuation of application No. PCT/CN2012/087279, filed on Dec. 24, 2012.

(30) Foreign Application Priority Data

May 14, 2012   (CN) .......................... 2012 1 0148514

(51) Int. Cl.
*H04W 74/08* (2009.01)
*H04L 12/807* (2013.01)
*H04L 12/937* (2013.01)

(52) U.S. Cl.
CPC ............ *H04L 49/254* (2013.01); *H04L 47/27* (2013.01); *H04W 74/085* (2013.01)

(58) Field of Classification Search
CPC . H04W 52/0216; H04W 84/12; Y02D 70/142
(Continued)

(56) References Cited

U.S. PATENT DOCUMENTS 8,018,882 B1     9/2011 Chhabra
2004/0028072 A1*  2/2004 Moutarlier ............ H04L 12/413
                                           370/448
(Continued)

FOREIGN PATENT DOCUMENTS

CN       102088792 A    6/2011
CN       102104940 A    6/2011
WO    WO 2011/162114 A1   12/2011

OTHER PUBLICATIONS

Dr. Jiunn Deng, et al., "A Priority Scheme for IEEE 802.11 DCF Access Method", IEICE Trans. Commun., vol. E82-B, No. 1, Jan. 1999, p. 96-102.
(Continued)

*Primary Examiner* — Chandrahas B Patel

(57) ABSTRACT

A method includes determining at least one first station; and sending first indication information to the first station, where the first indication information is used for indicating at least one first backoff duration, so that the first station performs a data transmission operation by using the first backoff duration, and the first backoff duration used by the first station to perform a data transmission operation is less than a second backoff duration used by a second station to perform a data transmission operation, or the first backoff duration used by the first station to perform a data transmission operation is greater than the second backoff duration used by the second station to perform a data transmission operation. Shortening backoff durations of some stations can ensure that these stations send data first, and extending backoff durations of some stations can ensure that the other stations send data first.

12 Claims, 7 Drawing Sheets

(58) Field of Classification Search
USPC .......................................................... 370/448
See application file for complete search history.

(56) References Cited

U.S. PATENT DOCUMENTS

| | | | |
|---|---|---|---|
| 2004/0264423 A1* | 12/2004 | Ginzburg | H04W 74/0816 370/338 |
| 2005/0025176 A1* | 2/2005 | Ko | H04W 74/085 370/448 |
| 2006/0034199 A1 | 2/2006 | Chu et al. | |
| 2006/0087984 A1* | 4/2006 | Kim | H04B 7/2643 370/252 |
| 2006/0187951 A1 | 8/2006 | Ginzburg et al. | |
| 2009/0180453 A1 | 7/2009 | Hu | |
| 2011/0075642 A1 | 3/2011 | Cordeiro et al. | |
| 2011/0305216 A1 | 12/2011 | Seok | |
| 2013/0053075 A1 | 2/2013 | Yoshizawa et al. | |
| 2013/0142097 A1 | 6/2013 | Gong et al. | |
| 2013/0250832 A1* | 9/2013 | Kim | H04W 52/0216 370/311 |
| 2014/0169288 A1 | 6/2014 | Cordeiro | |

OTHER PUBLICATIONS

Minyoung Park, et al., "TGah Efficient TIM Encoding", IEEE 802.11-12/388r1, Mar. 2012, 26 pages.

* cited by examiner

500

```
Determine whether a station that needs to transmit data
within a sending period of a first beacon frame exists in
user stations stations indicated by blocks in a traffic      ⸺ S510
indication map TIM included in the first beacon frame
```

⬇

```
Determine a first field in a page in the TIM, where the first
field carries third indication information, and the third
indication information is used for indicating whether a
station that needs to transmit data within the sending       ⸺ S520
period of the first beacon frame exists in the stations
indicated by the blocks in the TIM
```

⬇

```
Send the beacon frame                                         ⸺ S530
```

```
Receive a first beacon frame including a traffic indication
map TIM, where a first field in a page in the TIM carries
third indication information, and the third indication
information is used for indicating whether a station that    ⸺ S610
needs to transmit data within a sending period of the first
beacon frame exists in stations indicated by blocks in the
TIM
```

⬇

```
Acquire the third indication information from the first
field                                                         ⸺ S620
```

⬇

```
Determine, according to the third indication information,
whether a station that needs to transmit data within the
sending period of the first beacon frame exists in the       ⸺ S630
stations indicated by the blocks in the TIM
```

FIG. 6

METHOD AND APPARATUS FOR CONTROLLING DATA TRANSMISSION

CROSS-REFERENCE TO RELATED APPLICATION

This application is a continuation of International Application No. PCT/CN2012/087279, filed Dec. 24, 2012, which claims priority to Chinese Patent Application No. 201210148514.2, filed May 14, 2012, both of which are hereby incorporated by reference in their entireties.

TECHNICAL FIELD

The present invention relates to the communications field, and in particular, to a method and an apparatus for controlling data transmission.

BACKGROUND

In a contention-based system, when needing to send data, a station usually listens to a channel first, and if the channel is idle, performs a backoff operation, that is, randomly selects a backoff duration from a contention window, sets a backoff timer, and starts to send the data when the backoff timer counts down to zero. If backoff timers of two stations synchronously reach zero, a collision occurs. In this case, a receiving station may not be capable of correctly receiving data, resulting in another backoff of the station. When a large number of stations need to access a channel, the probability that a collision occurs is increased, causing a reduction to a throughput of the system. After a collision occurs, a user in the collision usually increases a size of a contention window, then randomly selects a backoff duration from the increased contention window, and sets a backoff timer. If a collision occurs again, this process is repeated. After the contention window increases in size to reach a maximum contention window, the contention window is kept unchanged, and a backoff duration is selected from the maximum contention window to set a backoff timer. A minimum contention window is restored only after the data is successfully sent.

However, in such a case in which the probability that a collision occurs is decreased by extending a backoff duration, the throughput of the system is lowered when the number of contending stations is small.

SUMMARY

Embodiments of the present invention provide a method and an apparatus for controlling data transmission, which can reduce occurrence of collisions between stations.

According to an aspect, a method for controlling data transmission is provided. The method includes: determining at least one first station; sending first indication information to the first station, where the first indication information is used for indicating at least one first backoff duration, so that the first station performs a data transmission operation by using the first backoff duration, and the first backoff duration used by the first station to perform a data transmission operation is less than a second backoff duration used by a second station to perform a data transmission operation, or the first backoff duration used by the first station to perform a data transmission operation is greater than the second backoff duration used by the second station to perform a data transmission operation.

According to another aspect, a method for controlling data transmission is provided. The method includes: acquiring, by a first station, first indication information, where the first indication information is used for indicating at least one first backoff duration; determining the first backoff duration according to the first indication information; and performing a data transmission operation by using the first backoff duration, where the first backoff duration used by the first station to perform a data transmission operation is less than a second backoff duration used by a second station to perform a data transmission operation, or the first backoff duration used by the first station to perform a data transmission operation is greater than the second backoff duration used by the second station to perform a data transmission operation.

According to yet another aspect, an apparatus for controlling data transmission is provided. The apparatus includes: a determining unit, configured to determine at least one first station; and a sending unit, configured to send first indication information to the first station, where the first indication information is used for indicating at least one first backoff duration, so that the first station performs a data transmission operation by using the first backoff duration, and the first backoff duration used by the first station to perform a data transmission operation is less than a second backoff duration used by a second station to perform a data transmission operation, or the first backoff duration used by the first station to perform a data transmission operation is greater than the second backoff duration used by the second station to perform a data transmission operation.

According to yet another aspect, an apparatus for controlling data transmission is provided. The apparatus includes: an acquiring unit, configured to enable a first station to acquire first indication information, where the first indication information is used for indicating at least one first backoff duration; a determining unit, configured to determine the first backoff duration according to the first indication information; and an operation unit, configured to perform a data transmission operation by using the first backoff duration, where the first backoff duration used by the first station to perform a data transmission operation is less than a second backoff duration used by a second station to perform a data transmission operation, or the first backoff duration used by the first station to perform a data transmission operation is greater than the second backoff duration used by the second station to perform a data transmission operation.

For a method and an apparatus for controlling data transmission according to the embodiments of the present invention, shortening backoff durations of some stations can ensure that these stations send data first, thereby reducing occurrence of collisions with other stations, and extending backoff durations of some stations can ensure that the other stations send data first, thereby reducing occurrence of collisions with these stations. Therefore, occurrence of collisions between the stations can be reduced.

BRIEF DESCRIPTION OF THE DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 5 is a schematic flowchart of a method for controlling data transmission according to yet another embodiment of the present invention;

FIG. 6 is a schematic flowchart of a method for controlling data transmission according to yet another embodiment of the present invention;

DETAILED DESCRIPTION

The following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

The present invention is applicable to various communications systems in which channel use permission is acquired in a contention manner, for example: a Wireless Fidelity network (WiFi, Wireless Fidelity), which may also be referred to as a wireless local area network. In the following, as exemplary description rather than limitative description, a method and a apparatus for controlling data transmission in the present invention are described by using a wireless fidelity network as an example.

Figure 1:
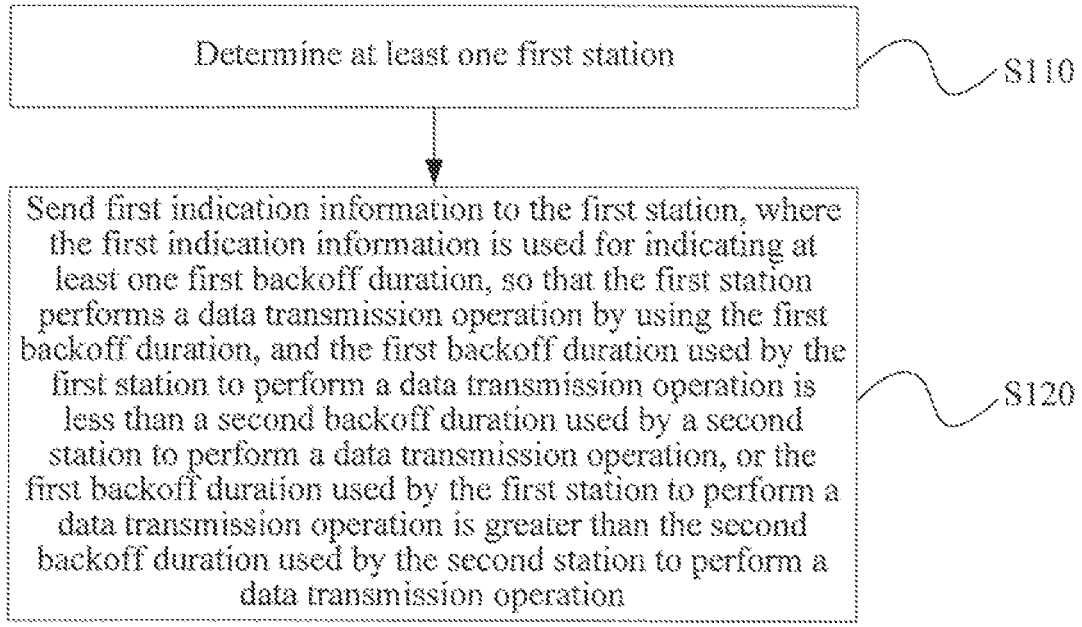
FIG. 1 is a schematic flowchart of a method for controlling data transmission according to an embodiment of the present invention.

FIG. 1 is a schematic flowchart of a method 100 for controlling data transmission according to an embodiment of the present invention as described from the perspective of an access point. As shown in FIG. 1, the method 100 includes:

S110. Determine at least one first station.

S120. Send first indication information to the first station, where the first indication information is used for indicating at least one first backoff duration, so that the first station performs a data transmission operation by using the first backoff duration, and the first backoff duration used by the first station to perform a data transmission operation is less than a second backoff duration used by a second station to perform a data transmission operation, or the first backoff duration used by the first station to perform a data transmission operation is greater than the second backoff duration used by the second station to perform a data transmission operation.

Specifically, in S110, an access point (access point, Access Point) may select, from stations, at least one station as a priority station (an example of the first station), and another station as an ordinary station (an example of the second station). In other words, the first station and the second station have different backoff durations, and the first backoff duration is not equal to the second backoff duration. Backoff durations of the stations are distinguished by using arrangement of priority levels.

Optionally, in this embodiment of the present invention, as an example rather than a limitation, the access point may select all or some stations, which need to transmit data within a sending period of one beacon frame (a first beacon frame is used as an example in the following description), as priority stations and use the rest other stations as ordinary stations. Moreover, the access point may also select all or some stations that do not need to transmit data within a sending period of the first beacon frame as the priority stations, and use the rest other stations as ordinary stations.

Alternatively, in this embodiment of the present invention, as an example rather than a limitation, the access point may also divide a period of the first beacon frame into, for example, 16 time segments, arrange and number the 16 time segments by using, for example, binary digits (for example, the first time segment is 0000, the second time segment is 0001, . . . , and the sixteenth time segment is 1111), select a station having an association identifier (AID, Association Identifier) or a basic service set identifier (BSSID, Basic Service Set Identifier) whose last four digits are the same as a sequence number of the time segment as a priority station, and use the rest other stations as ordinary stations. Moreover, the access point may also use a station having an AID or a BSSID whose last four digits are different from the sequence number of the time segment as a priority station, and use the rest other stations that need to transmit data as ordinary stations.

It should be understood that the methods for selecting a priority station listed above are only one embodiment of the present invention, and other methods that can determine a priority station and used parameters all fall within the protection scope of the present invention.

In this embodiment of the present invention, a "station" may include a user station, or may also include an access point, which is not specifically limited in the present invention.

In this embodiment of the present invention, the first backoff duration may be a fixed value agreed upon between the access point and the station in advance, so that the first indication information may be one indication identifier (Case 1); or, the first backoff duration may also be a value independently determined by the access point, so that the first indication information needs to indicate a specific value of the duration for the station (Case 2). The two cases are described separately in the following.

Case 1

Optionally, during implementation of the present invention, the access point may negotiate with all stations and predetermine a backoff duration (the first backoff duration) used when a station is determined as a high priority station (the priority station), for example, 0 time unit, 1 time unit, 2 timeslots or the like. The "0 time unit" represents that the station does not need to perform backoff when a channel is idle and may directly send data; the process that the station performs backoff and sends data is described in detail subsequently. The time unit here is usually a manually specified time length. The description of a same or similar case is omitted below. Moreover, the station may save the predetermined first backoff duration, so that the station may determine the first backoff duration according to an indication identifier (an example of the first indication information) sent by the access point.

Moreover, the access point may negotiate with all stations and predetermine a backoff duration (second duration) used when a station is determined as a low priority station (the ordinary station). The backoff duration allocated to the ordinary station may be the same as a backoff duration specified in the prior art. In this embodiment of the present invention, it only needs to ensure that a statistical average value of backoff durations allocated to priority stations is less than a statistical average value of backoff durations allocated to ordinary stations. The description of a same or similar case is omitted below. Moreover, the station may save the predetermined second backoff duration, so that the station may determine the second backoff duration according to the indication identifier (an example of the first indication information) sent by the access point.

Therefore, in S120, when notifying the station of the backoff duration used to perform data transmission, the access point may only send to the station one indication identifier for indicating a priority level of the station, so that the station may determine to use the pre-negotiated and saved first backoff duration or second backoff duration according to indication information for indicating the priority level of the station.

Case 2

Optionally, for the priority station, the access point may allocate a relatively short priority backoff duration to the priority station; moreover, for the ordinary station, the access point may allocate a relatively long backoff duration to the ordinary station, for example, the backoff duration allocated to the ordinary station may be the same as a backoff duration specified in the prior art; in this embodiment of the present invention, it only needs to ensure that a statistical average value of backoff durations allocated to priority stations is less than a statistical average value of backoff durations allocated to ordinary stations.

Therefore, in S120, the access point may also deliver, to the station, a specific value of the backoff duration used to perform data transmission (another example of the first indication information) when performing information transmission (it may include data transmission or signaling transmission) to the station.

Optionally, in this embodiment of the present invention, that the first backoff duration used by the first station to perform a data transmission operation is less than a second backoff duration used by a second station to perform a data transmission operation includes that:

a statistical average value of the first backoff duration used by the first station to perform a data transmission operation is less than a statistical average value of the second backoff duration used by the second station to perform a data transmission operation; or that the first backoff duration used by the first station to perform a data transmission operation is greater than the second backoff duration used by the second station to perform a data transmission operation includes that:

a statistical average value of the first backoff duration used by the first station to perform a data transmission operation is greater than a statistical average value of the second backoff duration used by the second station to perform a data transmission operation.

Specifically, the priority station uses at least one relatively short priority backoff duration (referred to as a priority backoff window below), that is, the window may include multiple candidate duration values, for example, 0 time unit, 1 time unit, 2 timeslots, . . . , and 15 timeslots. When performing data transmission, the priority station determines one backoff duration from the window by using one random function; therefore, the priority backoff duration may be any length of 0 time unit, 1 time unit, 2 timeslots, . . . , and 15 timeslots.

Meanwhile, the ordinary station uses at least one relatively long priority backoff duration (referred to as an ordinary backoff window below), that is, the window may also include multiple candidate duration values, for example, 0 time unit, 1 time unit, . . . , and 63 timeslots. When performing data transmission, the ordinary station also determines one backoff duration from the window by using one random function; therefore, the ordinary backoff duration may be any length of 0 time unit, 1 time unit, . . . , and 63 timeslots.

Therefore, for example, a case may occur in which the backoff duration of the priority station is 15 timeslots and the backoff duration of the ordinary station is 10 timeslots. However, according to the random function (usually a uniform random function), it may be determined that the statistical average value of the backoff duration of the priority station is less than the statistical average value of the backoff duration of the ordinary station, and the random function used in the foregoing process may be the same as a random function used in the prior art, which is no longer elaborated herein.

Optionally, in this embodiment of the present invention:
the sending first indication information to the at least one first station includes:
sending the first indication information to at least two first stations, where first backoff durations indicated by the first indication information sent to the first stations are same or different.

Specifically, when there are more than two priority stations, the more than two priority stations may contend for a channel by using a contention manner. A different backoff duration may also be allocated to each priority station. For example, when there are three priority stations, backoff durations, for example, 0 timeslot, 1 timeslot, and 2 timeslots may be allocated to the three priority stations respectively. Therefore, a collision may be avoided among these priority stations.

Optionally, in this embodiment of the present invention, the determining at least one first station includes:
determining a station that needs to transmit data within a sending period of a first beacon frame as the first station; and
the sending first indication information to the first station includes:
sending the first indication information to the first station by using the first beacon frame, so that the first station determines, according to a traffic indication map TIM included in the first beacon frame, that data needs to be transmitted within the sending period of the first beacon frame, and then acquires the first indication information from the first beacon frame; or the determining at least one first station includes:
determining a station that does not need to transmit data within a sending period of a first beacon frame as the first station; and
the sending first indication information to the first station includes:
sending the first indication information to the first station by using the first beacon frame, so that the at least one first station determines, according to a TIM included in the first beacon frame, that no data needs to be transmitted within the sending period of the first beacon frame, and then acquires the first indication information from the first beacon frame.

Specifically, in this embodiment of the present invention, the station may enter a power save mode (PS mode, Power Save mode) to save power. The station that enters the power save mode may not listen to any signal from an ambient environment, except for a beacon frame (Beacon). The station in the power save mode listens to a traffic indication map (TIM, Traffic Indication Map) in a beacon frame and determines whether an access point has temporarily stored data to be sent to the station. As the access point periodically sends a beacon frame to all stations, the access point may use one beacon frame (the first beacon frame) to carry the indication information (the first indication information) for indicating the priority backoff duration. In this case, the access point may negotiate with the stations to enable the first station of the stations to determine that the first station needs to acquire the first indication information from the first beacon frame while the second station does not need to acquire the first indication information from the first beacon frame. As an example rather than a limitation, the access point may send a message to the first station to indicate that the first station needs to acquire the first indication information from the first beacon frame.

For another example, it may also be specified that: a station (an example of the first station) that needs to transmit data within the sending period of the first beacon frame needs to acquire the first indication information from the first beacon frame. In addition, it may also be specified that: a station (another example of the first station) that does not need to transmit data within the sending period of the first beacon frame needs to acquire the first indication information from the first beacon frame.

Moreover, in this case, the station may determine whether data needs to be transmitted within a sending period of the beacon frame according to the TIM included in the beacon frame. Generally, a bitmap (bitmap) in the TIM may be divided into three levels: a page (Page), a block (Block), and a sub-block (Sub-Block). A bitmap corresponding to all stations may be divided into several pages, each page may include several blocks, each block may include several sub-blocks, each sub-block may include several bits (length), and each bit indicates one station. In this manner, an AID of each station may be indexed by a page identifier, a block identifier, a sub-block identifier, and a bit location identifier of the AID in a corresponding sub-block. In this case, a TIM part in the beacon frame includes a page field, a block offset field (Block offset), a block control (Block Control) field, a block bitmap (Block bitmap) field, and a sub-block bitmap (Sub-block bitmap) field. The page field indicates a page in which a station that needs to transmit data is located in the bitmap, the block offset field indicates an amount of offset of a block in which the station is located in the page, the block control field indicates a manner used in current beacon transmission, the block bitmap field indicates a map location of a sub-block in which the station needing to transmit data is located in the block to which the sub-block belongs, and the sub-block bitmap field indicates which bit is 1 specifically. Generally, a bit in the block bitmap field being 0 represents that none of the stations in the sub-block corresponding to the bit has data to transmit, and the bit being 1 represents that at least one station in the corresponding sub-block has data that needs to be transmitted. When the number of 1s included in the block bitmap field is n, the TIM part in the beacon frame carries n sub-blocks, and each bit in each sub-block indicates a case of data transmission of a corresponding station, where the bit being 0 represents that no data needs to be transmitted, and the bit being 1 represents that data needs to be transmitted. The description of a same or similar case is omitted below.

Optionally, in this embodiment of the present invention, the method further includes:
sending third indication information to the first station by using the first beacon frame, where the third indication information is used for indicating whether a station that needs to transmit data within the sending period of the first beacon frame exists in stations indicated by blocks in the TIM, and the third indication information is carried in a first field in a page in the TIM.

Specifically, when it is determined based on the TIM in the first beacon frame whether data needs to be transmitted within the sending period of the first beacon frame, the station needs to first sequentially needs to search for bits of a page, block, and sub-block to which the station belongs to determine whether the station has data; because the length of each block is not fixed, and if in the entire block, no station has data, the block may not appear in the TIM. In this case, one station needs to parse all blocks at one time in a corresponding page to determine whether a block is the block that the station belongs to, and determines a start location of a next block according to a structure of the block. The entire monitoring process is serially performed, and is therefore relatively troublesome. Therefore, in this embodiment of the present invention, indication information (the third indication information) used for indicating whether the first station needs to transmit data within the sending period of the first beacon frame may be delivered to the first station. The description of a same or similar case is omitted below.

Optionally, in this embodiment, the access point may send a message to the station to deliver the third indication information.

Optionally, as an example rather than a limitation, the access point may further add one page bitmap (page bitmap) to each page in the TIM, where each block corresponds to one bit in the page bit map; when a bit is set to 1, it represents that at least one station in the block needs to transmit data or is scheduled; when the bit is set to 0, it represents that none of the stations in the block needs to transmit data or is scheduled.

Therefore, when a station discovers that a bit corresponding to a block to which the station belongs in the page bitmap is set to 0, the station learns that the station does not need to transmit data within the sending period of the beacon frame, and therefore does not need to further parse any block. Accordingly, by adding a page bitmap into an existing TIM, the access point does not need to indicate whether the station needs to transmit data within the sending period of the first beacon frame by using an independent message or independent indication information, thereby improving practicability of this embodiment of the present invention.

It should be understood that the methods for notifying that the first station needs to acquire the first indication information from the first beacon frame listed above are only one embodiment of the present invention, and other methods for notifying that the first station needs to acquire the first indication information from the first beacon frame and used parameters all fall within the protection scope of the present invention.

For clearer explanation, the priority station is used as the first station in the following description. In addition, when the ordinary station is used as the first station, the first backoff duration is greater than the second backoff duration, and the rest processing is the same as or similar to the processing when the priority station is used as the first station.

After acquiring the first indication information and determining the first backoff duration (the priority backoff duration) according to the first indication information, when needing an access point to send data, the priority station may listen to a channel, and if the channel is idle, set a backoff timer according to the priority backoff duration; for example, if the priority backoff duration is 2 timeslots, after the backoff timer is set to 2 timeslots and the backoff timer counts down to zero (2 timeslots elapse after it detects that the channel is idle), the priority station starts to send data. It should be noted that, if the priority backoff duration is 0 time unit, it represents that the station may start to send data immediately without backoff after detecting that the channel is idle.

This embodiment of shortening a backoff duration of a priority station to ensure that the priority station first sends data when a channel is idle is listed above; however, the present invention is not limited thereto. For example, a duration of an ordinary station may also be extended to ensure that the priority station first sends data when the channel is idle. In this case, the ordinary station is used as the first station, and for the ordinary station, an access point may allocate a relatively long ordinary backoff duration (such as 128 timeslots, 256 timeslots or 512 timeslots) to the ordinary station; also, the ordinary backoff duration is used as the first backoff duration and sent to the first station, and the rest operation procedures are the same as or similar to the foregoing, which are no longer elaborated herein.

Optionally, in this embodiment of the present invention, the method further includes:

determining a scheduling period; and sending second indication information to the first station, where the second indication information is used for indicating the scheduling period, so that the first station performs a data transmission operation by using the first backoff duration within the scheduling period.

Specifically, in this embodiment of the present invention, the access point may further determine, for the first station, one time segment (scheduling period) of performing a data transmission operation according to the first backoff duration, so that, the first station performs a data transmission operation according to the first backoff duration within the time segment, and beyond the time segment, performs a data transmission operation according to other backoff durations (for example, the second backoff duration).

Optionally, in this embodiment of the present invention, the determining at least one first station includes:

determining a station that needs to transmit data within a sending period of a first beacon frame as the first station; and the sending first indication information to the first station includes:

sending the first indication information to the first station by using the first beacon frame, so that the first station determines, according to a traffic indication map TIM included in the first beacon frame, that data needs to be transmitted within the sending period of the first beacon frame, and then acquires the first indication information from the first beacon frame; or the determining at least one first station includes:

determining a station that does not need to transmit data within a sending period of a first beacon frame as the first station; and the sending first indication information to the first station includes:

sending the first indication information to the first station by using the first beacon frame, so that the at least one first station determines, according to a TIM included in the first beacon frame, that no data needs to be transmitted within the sending period of the first beacon frame, and then acquires the first indication information from the first beacon frame.

Specifically, the access point may divide the sending period of one beacon frame (the first beacon frame) sent to the station into at least one time segment (the scheduling period).

Moreover, while the access point selects the station that needs to transmit data within the sending period of the first beacon frame as the priority station as discussed above, the access point may divide the sending period into scheduling periods of which the number is the same as the number of the priority stations, so that there is one priority station in each scheduling period. Moreover, the access point may also divide the sending period into scheduling periods of which the number is less than the number of the priority stations same, so that there are more than two priority stations in some or all of the scheduling periods.

Alternatively, in this embodiment of the present invention, as an example rather than a limitation, the access point may also divide a period of the first beacon frame into, for example, 16 time segments, arrange and number the 16 time segments by using, for example, binary digits (for example, the first time segment is 0000, the second time segment is 0001, . . . , and the sixteenth time segment is 1111), select a station having an AID or a BSSID whose last four digits are the same as a sequence number of the time segment as a priority station, and use the rest other stations as ordinary stations. Moreover, the access point may also use a station having an AID or a BSSID whose last four digits are different from the sequence number of the time segment as a priority station, and use the rest other stations as ordinary stations.

It should be understood that the methods for dividing scheduling periods listed above, that is, the number of divided scheduling periods is only one embodiment of the present invention, and other methods that can determine the priority station, other used parameters, and other numbers of divided scheduling periods all fall within the protection scope of the present invention.

In this embodiment of the present invention, as the access point periodically sends the first beacon frame to all stations, the access point may use the first beacon frame to carry indication information (an example of the second indication information) for indicating the scheduling period (including a length of the scheduling period and start time of the scheduling period). In this case, the access point may negotiate with the stations to enable the first station of the stations to determine that the first station needs to acquire the second indication information from the first beacon frame. As an example rather than a limitation, the access point sends a message to the first station to indicate that the first station needs to acquire the second indication information from the first beacon frame.

For another example, it may be specified that: the station (an example of the first station) that needs to transmit data within the sending period of the first beacon frame needs to acquire the second indication information from the first beacon frame. In addition, it may also be specified that: a station (another example of the first station) that does not need to transmit data within the sending period of the first beacon frame needs to acquire the first indication information from the first beacon frame.

Moreover, in this case, the station may determine, according to the TIM included in the first beacon frame, whether data needs to be transmitted within the sending period of the first beacon frame.

In this embodiment of the present invention, the access point may determine that the scheduling periods allocated to the first stations have a same duration, and only deliver, to the access point, indication information (another example of the second indication information) indicating the duration of the scheduling period. Therefore, the first station may calculate a start point of the scheduling period according to an arrangement order of the first station in the TIM and the duration of the scheduling period. For example, the duration of the scheduling period is set to T, and if one station (an example of the first station) that needs to transmit data within a period of the first beacon frame discovers that before the station there are K stations that need to transmit data within the period of the first beacon frame, the start point of the time segment in which the station is scheduled may be (K+n)*T+T0, where n is a scheduling time segment offset introduced in consideration of some special cases (for example, a collision may occur within the first scheduling time segment because an ordinary station selects 0 time length as a backoff time), and T0 is an amount of offset of the scheduling time segment relative to a time reference point (for example, an end time of the first beacon frame).

In this case, the first station needs to learn the number of stations that need to transmit data before the first station in the TIM; because in a layered TIM compression structure, a station that needs to transmit data needs to sequentially parse all blocks before the station to make a count, and because a different compression manner is used for each block, the count process is relatively troublesome. Therefore, in this embodiment of the present invention, when the first station needs to transmit data within the sending period of the first beacon frame, the access point may deliver, to the first station, indication information (an example of fourth indication information) for indicating the number of stations that need to transmit data in each block in the TIM included in the first beacon frame. In this manner, the first station may rapidly and conveniently count the stations that need to transmit data before the first station, so as to determine the scheduling period rapidly.

Optionally, the access point may add one piece of indication information to each block to indicate the number of scheduled stations in the block. Moreover, multiple blocks may also be bound together to indicate a total sum of the numbers of scheduled stations included in the blocks. In this manner, a scheduled station only needs to make simple summation to obtain the number of scheduled stations in all blocks before the station.

In this manner, by adding one field into at least one block in an existing TIM, the access point does not need to indicate whether the station has downlink data within the sending period of the first beacon frame by using an independent message or independent indication information, thereby improving practicability of this embodiment of the present invention.

It may be understood that in this embodiment described above, the first backoff duration (a statistical average value) being less than the second backoff duration (a statistical average value) corresponds to the embodiment in which the first station is a priority station having a high priority level, whereas the first backoff duration (a statistical average value) being greater than the second backoff duration (a statistical average value) corresponds to the embodiment in which the first station is an ordinary station having a low priority level. That is, in this embodiment of the present invention, a relatively short backoff duration may be allocated to the priority station to ensure that the priority station sends data first, and a relatively long backoff duration may also be allocated to the ordinary station to ensure that the priority station sends data first by.

In this embodiment of the present invention, as discussed above, the access point may allocate a scheduling period having a same length to each first station, and then each station finds a corresponding scheduling time segment according to a location of the station in the TIM; also, in this case, the access point may also negotiate with a station to agree upon a length of a scheduling period, and the station may save the length of the scheduling period, so that the first station may calculate a start point of the scheduling period by counting an arrangement order of the first station in the TIM and a duration of the scheduling period as discussed above, so as to determine the scheduling period. However, the present invention is not limited thereto, and the access point may also allocate a scheduling period having a different length to each first station according to transmission time required for each first station.

In the foregoing description, embodiments are listed in which an access point sends each piece of indication information to a station by using a first beacon frame; however, the present invention is not limited thereto, and the access point may also send each piece of indication information by using a scheduling frame. Moreover, the scheduling frame may exist in an independent manner, or may also be included in a beacon frame.

In the foregoing description, an access point in wireless fidelity is used as an example for description; however, the present invention is not limited thereto, and devices and apparatuses in another contention-type wireless network that are configured to enable a station to access the network all fall within the protection scope of the present invention.

For a method for controlling data transmission according to this embodiment of the present invention, shortening backoff durations of some stations can ensure that these stations send data first, thereby reducing occurrence of collisions with other stations, and extending backoff durations of some stations can ensure that the other stations send data first, thereby reducing occurrence of collisions with these stations. Therefore, occurrence of collisions can be reduced.

Figure 2:
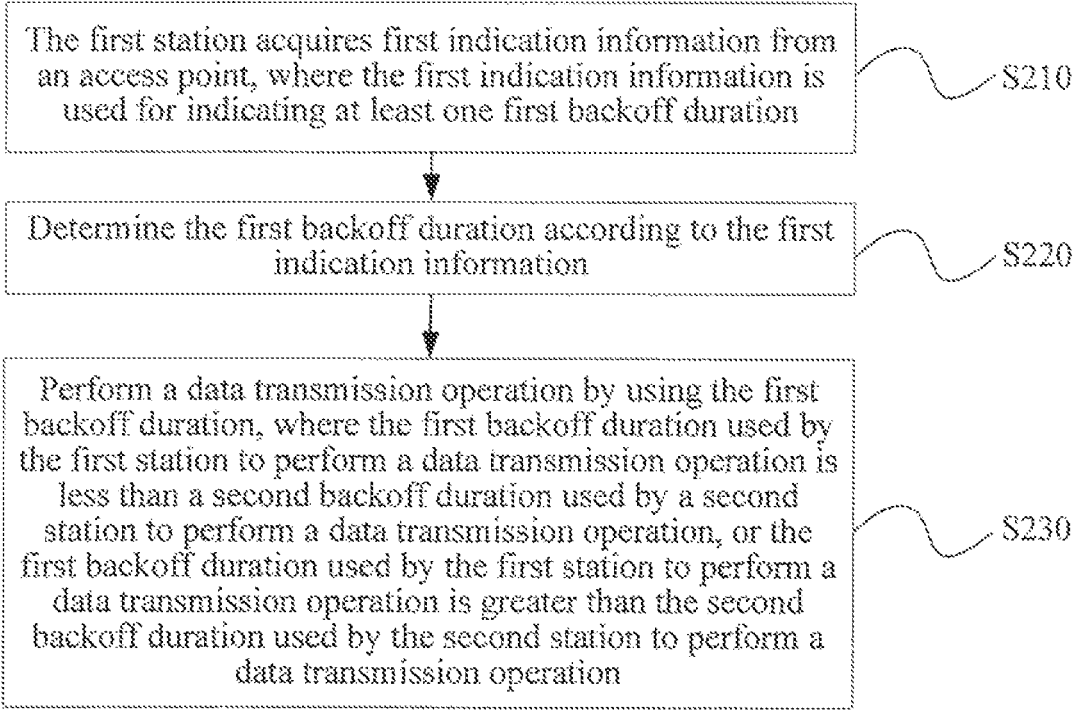
FIG. 2 is a schematic flowchart of a method for controlling data transmission according to another embodiment of the present invention.

FIG. 2 is a schematic flowchart of a method 200 for controlling data transmission according to an embodiment of the present invention as described from the perspective of a station (an example of a first station). As shown in FIG. 2, the method 200 includes:

S210. The first station acquires first indication information, where the first indication information is used for indicating at least one first backoff duration.

S220. Determine the first backoff duration according to the first indication information.

S230. Perform a data transmission operation by using the first backoff duration, where the first backoff duration used by the first station to perform a data transmission operation is less than a second backoff duration used by a second station to perform a data transmission operation, or the first backoff duration used by the first station to perform a data transmission operation is greater than the second backoff duration used by the second station to perform a data transmission operation.

Specifically, the access point may select, from stations, at least one station as a priority station (an example of the first station), and use another station as an ordinary station (an example of the second station).

Optionally, in this embodiment of the present invention, as an example rather than a limitation, the access point may select all or some stations, which need to transmit data within a sending period of one beacon frame (a first beacon frame is used as an example in the following description), as priority stations and use the rest other stations as ordinary stations. Moreover, the access point may also select all or some stations that do not need to transmit data within a sending period of the first beacon frame as the priority stations, and use the rest other stations as ordinary stations.

Alternatively, in this embodiment of the present invention, as an example rather than a limitation, the access point may also divide a period of the first beacon frame into, for example, 16 time segments, arrange and number the 16 time segments by using, for example, binary digits (for example, the first time segment is 0000, the second time segment is 0001, . . . , and the sixteenth time segment is 1111), select a station having an association identifier (AID, Association Identifier) or a basic service set identifier (BSSID, Basic Service Set Identifier) whose last four digits are the same as a sequence number of the time segment as a priority station, and use the rest other stations as ordinary stations. Moreover, the access point may also use a station having an AID or a BSSID whose last four digits are different from the sequence number of the time segment as a priority station, and use the rest other stations that need to transmit data as ordinary stations.

It should be understood that the methods for selecting a priority station listed above are only one embodiment of the present invention, and other methods that can determine a priority station and used parameters all fall within the protection scope of the present invention.

After determining the priority station and the ordinary station, the access point may allocate a relatively short backoff duration (an example of the first backoff duration) to a high priority station (the priority station), for example, 0 time unit, 1 time unit, 2 timeslots or the like. The "0 time unit" represents that the station does not need to perform backoff when a channel is idle and may directly send data; the process that the station performs backoff and sends data is described in detail subsequently. The time unit here is usually a manually specified time length. The description of a same or similar case is omitted below. Moreover, the access point may allocate a relatively long backoff duration (an example of the second duration) to a low priority station (the ordinary station), and the backoff duration allocated to the ordinary station may be the same as a backoff duration specified in the prior art; in this embodiment of the present invention, it only needs to ensure that a statistical average value of backoff durations allocated to priority stations is less than a statistical average value of backoff durations allocated to ordinary stations.

Optionally, in this embodiment of the present invention, that the first backoff duration used by the first station to perform a data transmission operation is less than a second backoff duration used by a second station to perform a data transmission operation includes that:

a statistical average value of the first backoff duration used by the first station to perform a data transmission operation is less than a statistical average value of the second backoff duration used by the second station to perform a data transmission operation; or that the first backoff duration used by the first station to perform a data transmission operation is greater than the second backoff duration used by the second station to perform a data transmission operation includes that:

a statistical average value of the first backoff duration used by the first station to perform a data transmission operation is greater than a statistical average value of the second backoff duration used by the second station to perform a data transmission operation.

Specifically, the priority station uses at least one relatively short priority backoff duration (referred to as a priority backoff window below), that is, the window may include multiple candidate duration values, for example, 0 time unit, 1 time unit, 2 timeslots, . . . , and 15 timeslots. When performing data transmission, the priority station determines one backoff duration from the window by using one random function; therefore, the priority backoff duration may be any length of 0 time unit, 1 time unit, 2 timeslots, . . . , and 15 timeslots.

Moreover, the ordinary station uses at least one relatively long priority backoff duration (referred to as an ordinary backoff window below), that is, the window may also include multiple candidate duration values, for example, 0 time unit, 1 time unit, . . . , and 63 timeslots. When performing data transmission, the ordinary station also determines one backoff duration from the window by using one random function; therefore, the ordinary backoff duration may be any length of 0 time unit, 1 time unit, . . . , and 63 timeslots.

Therefore, for example, a case may occur in which the backoff duration of the priority station is 15 timeslots and the backoff duration of the ordinary station is 10 timeslots. However, according to the random function (usually a uniform random function), it may be determined that the statistical average value of the backoff duration of the priority station is less than the statistical average value of the backoff duration of the ordinary station, and the random function used in the foregoing process may be the same as a random function used in the prior art, which is no longer elaborated herein.

The access point may use the selected priority station as the foregoing first station, and delivers a relatively short duration priority backoff duration (an example of the first backoff duration) to the first station. For clearer explanation, the priority station is used as the first station in the following description. In addition, when the ordinary station is used as the first station, the first backoff duration is greater than the second backoff duration, and the rest processing is the same as or similar to the processing when the priority station is used as the first station.

In S210, the priority station acquires the first backoff duration.

Optionally, in this embodiment of the present invention, the acquiring first indication information from the access point includes:

receiving a first beacon frame that is sent by the access point and includes the first indication information;

determining that data needs to be sent within a sending period of the first beacon frame; or determining that no data needs to be sent within a sending period of the first beacon frame; and acquiring the first indication information from the first beacon frame.

Specifically, in this embodiment of the present invention, the station may enter a power save mode to save power. The station that enters the power save mode may not listen to any signal from an ambient environment, except for a beacon frame. The station in the power save mode listens to a TIM in the first beacon frame and determines whether an access point has temporarily stored data to be sent to the station. As the access point periodically sends the first beacon frame to all stations, the access point may use the first beacon frame to carry the indication information (the first indication information) for indicating the priority backoff duration. In this case, the access point may negotiate with the stations to enable the first station of the stations to determine that the first station needs to acquire the first indication information from the first beacon frame. As an example rather than a limitation, when the first station is connected to the access point, the access point may send a message to the first station to indicate that the first station needs to acquire the first indication information from the first beacon frame.

For another example, it may also be specified that: a station (an example of the first station) that needs to send data within the sending period of the first beacon frame needs to acquire the first indication information from the first beacon frame. In addition, it may also be specified that: a station (another example of the first station) that does not need to send data within the sending period of the first beacon frame needs to acquire the first indication information from the first beacon frame.

Optionally, in this embodiment of the present invention, the determining that data needs to be sent within a sending period of the first beacon frame includes:

determining, according to a traffic indication map TIM included in the first beacon frame, that data needs to be sent within the sending period of the first beacon frame; or the determining that no data needs to be sent within a sending period of the first beacon frame includes:

determining, according to the TIM included in the first beacon frame, that no data needs to be sent within the sending period of the first beacon frame.

Specifically, the station may determine, according to the TIM included in the first beacon frame, whether data needs to be sent within the sending period of the first beacon frame. Generally, a bitmap in the TIM may be divided into three levels: a page, a block, and a sub-block. A bitmap corresponding to all stations may be divided into several pages, each page may include several blocks, each block may include several sub-blocks, each sub-block may include several bits (length), and each bit indicates one station. In this manner, an AID of each station may be indexed by a page identifier, a block identifier, a sub-block identifier, and a bit location identifier of the AID in a corresponding sub-block. In this case, a TIM part in the first beacon frame includes a page field, a block offset field, a block control field, a block bitmap field, and a sub-block bitmap field. The page field indicates a page in which a station that needs to transmit data is located in the bitmap, the block offset field indicates an amount of offset of a block in which the station is located in the page, the block control field indicates a manner used in current beacon transmission, the block bitmap field indicates a map location of a sub-block in which the station needing to transmit data is located in the block to which the sub-block belongs, and the sub-block bitmaps field indicates which bit is 1 specifically. Generally, a bit in the block bitmap field being 0 represents that none of the stations in the sub-block corresponding to the bit has data to transmit, and the bit being 1 represents that at least one station in the corresponding sub-block has data that needs to be transmitted. When the number of 1s included in the block bitmap field is n, the TIM part in the beacon frame carries n sub-blocks, and each bit in each sub-block indicates a case of data transmission of a corresponding station, where the bit being 0 represents that no data needs to be transmitted, and the bit being 1 represents that data needs to be transmitted. The description of a same or similar case is omitted below.

Optionally, in this embodiment of the present invention, the method further includes:

acquiring third indication information from a first field in a page in the TIM included in the first beacon frame, where the third indication information is used for indicating whether a station that needs to transmit data within the sending period of the first beacon frame exists in the stations indicated by the blocks in the TIM; and the determining that data needs to be transmitted within a sending period of the first beacon frame includes:

determining, according to the third indication information and the TIM, that data needs to be transmitted within the sending period of the first beacon frame; or the determining that no data needs to be transmitted within a sending period of the first beacon frame includes:

determining, according to the third indication information, that no data needs to be transmitted within the sending period of the first beacon frame.

Specifically, because when it is determined based on the TIM in the first beacon frame whether data needs to be sent within the sending period of the first beacon frame, the station needs to first sequentially needs to search for bits of a page, block, and sub-block to which the station belongs to determine whether the station has data; and the length of each block is not fixed, and if in the entire block, no station has data, the block may not appear in the TIM. In this case, one station needs to parse all blocks at one time in a corresponding page to determine whether a block is the block that the station belongs to, and determines a start location of a next block according to a structure of the block. The entire monitoring process is serially performed, and is therefore relatively troublesome. Therefore, in this embodiment of the present invention, indication information (the third indication information) used for indicating whether the first station needs to send data within the sending period of the first beacon frame may be delivered to the first station. The description of a same or similar case is omitted below.

In this manner, the first station may rapidly and conveniently determine whether downlink data exists within the sending period of the first beacon frame, so as to further determine whether the first indication information needs to be acquired.

Optionally, as an example rather than a limitation, the access point may add one page bitmap to each page, where each block corresponds to one bit in the page bit map; when a bit is set to 1, it represents that at least one station in the block has data or is scheduled; when the bit is set to 0, it represents that none of the stations in the block has data or is scheduled. Therefore, when a station discovers that a bit corresponding to a block that the station belongs to in the page bitmap is set to 0, the station learns that the station does not have downlink data within the sending period of the first beacon frame, so that the station does not need to further parse any block. The description of a same or similar case is omitted below.

In this manner, by adding a page bitmap into an existing TIM, the access point does not need to indicate whether the station has downlink data within the sending period of the first beacon frame by using an independent message or independent indication information, thereby improving practicability of this embodiment of the present invention.

It should be understood that the methods for notifying that the first station needs to acquire the first indication information from the first beacon frame listed above are only one embodiment of the present invention, and other methods for notifying that the first station needs to acquire the first indication information from the first beacon frame and used parameters all fall within the protection scope of the present invention.

In S220, the first station acquires the first indication information, and determines the first backoff duration (the priority backoff duration) according to the first indication information. In this embodiment of the present invention, the first backoff duration may be a fixed value agreed upon between the access point and the station in advance, so that the first indication information may be one indication identifier (Case 3); or, the first backoff duration may also be a value independently determined by the access point, so that the first indication information needs to indicate a specific value of the duration for the station (Case 4). The two cases are described separately in the following.

Case 3

Optionally, during implementation of the present invention, the access point may negotiate with all stations and predetermine a backoff duration (the first backoff duration) used when a station is determined as a high priority station (the priority station), for example, 0 time unit, 1 time unit, 2 timeslots or the like. The "0 time unit" represents that the station does not need to perform backoff when a channel is idle and may directly send data. Moreover, the station may save the predetermined first backoff duration, so that the station may determine the first backoff duration according to an indication identifier (an example of the first indication information) sent by the access point.

Moreover, the access point may negotiate with all stations and predetermine a backoff duration (second duration) used when a station is determined as a low priority station (the ordinary station). The backoff duration allocated to the ordinary station may be the same as a backoff duration specified in the prior art. In this embodiment of the present invention, it only needs to ensure that a statistical average value of backoff durations allocated to priority stations is less than a statistical average value of backoff durations allocated to ordinary stations. Moreover, a station may save the predetermined second backoff duration, so that the station may determine the second backoff duration according to the indication identifier (an example of the first indication information) sent by the access point. When notifying the station of the backoff duration used to perform data transmission, the access point may only send to the station one indication identifier for indicating a priority level of the station, so that in S220, the station may determine to use the pre-negotiated and saved first backoff duration or second backoff duration according to indication information for indicating the priority level of the station.

Case 4

Optionally, for the priority station, the access point may allocate a relatively short priority backoff duration to the priority station; moreover, for the ordinary station, the access point may allocate a relatively long backoff duration to the ordinary station, for example, the backoff duration allocated to the ordinary station may be the same as a backoff duration specified in the prior art; in this embodiment of the present invention, it only needs to ensure that a statistical average value of backoff durations allocated to priority stations is less than a statistical average value of backoff durations allocated to ordinary stations. The access point may also deliver, to the station, a specific value of the backoff duration used to perform data transmission (another example of the first indication information) when performing information transmission (it may include data transmission or signaling transmission) to the station. Therefore, in S220, the station may acquire the specific value from the first indication information.

In S230, the priority station may listen to a channel when needing to send data, and if the channel is idle, set a backoff timer according to the priority backoff duration; for example, if the priority backoff duration is 2 timeslots, after the backoff timer is set to 2 timeslots and the backoff timer times up (2 timeslots elapse after it detects that the channel is idle), the priority station starts to send data. It should be noted that, if the priority backoff duration is 0 time unit, it represents that the station may start to send data immediately without backoff after detecting that the channel is idle.

Optionally, in this embodiment of the present invention, the method further includes:

acquiring second indication information, where the second indication information is used for indicating a scheduling period; and determining the scheduling period according to the second indication information;

determining the scheduling period according to the second indication information; and the performing a data transmission operation by using the first backoff duration includes:

performing the data transmission operation by using the first backoff duration within the scheduling period.

Specifically, in this embodiment of the present invention, the access point may further determine, for the first station, one time segment (scheduling period) of performing a data transmission operation according to the first backoff duration, so that, the first station performs a data transmission operation according to the first backoff duration within the time segment, and beyond the time segment, performs a data transmission operation according to other backoff durations (for example, the second backoff duration).

Optionally, in this embodiment of the present invention, the method further includes:

forbidding data sending before the scheduling period.

Specifically, by forbidding data sending before the scheduling period, it may ensure that the first station enters a data transmission operation immediately after the channel becomes idle, that is, a backoff timer is set according to the priority backoff duration; for example, if the priority backoff duration is 2 timeslots, after the backoff timer is set to 2 timeslots and the backoff timer is reached (2 timeslots elapse after it detects that the channel is idle), the first station starts to send data.

In this embodiment of the present invention, the access point may divide the sending period of the first beacon frame sent to the station into at least one time segment (scheduling period). For example, the possibility is relatively high that a station having downlink data (data sent by the access point to the station) has uplink data (data sent by the station to the access point) within the sending period of the first beacon frame. Therefore, while the access point selects the station that needs to send data within the sending period of the first beacon frame as the priority station as discussed above, the access point may divide the sending period into scheduling periods of which the number is the same as the number of the priority stations, so that there is one priority station in each scheduling period. Moreover, the access point may also divide the sending period into scheduling periods of which the number is less than the number of the priority stations same, so that there are more than two priority stations in some or all of the scheduling periods.

Alternatively, in this embodiment of the present invention, as an example rather than a limitation, the access point may also divide a period of the first beacon frame into, for example, 16 time segments, arrange and number the 16 time segments by using, for example, binary digits (for example, the first time segment is 0000, the second time segment is 0001, . . . , and the sixteenth time segment is 1111), select a station having an AID or a BSSID whose last four digits are the same as a sequence number of the time segment as a priority station, and use the rest other stations as ordinary stations. Moreover, the access point may also use a station having an AID or a BSSID whose last four digits are different from the sequence number of the time segment as a priority station, and use the rest other stations as ordinary stations.

It should be understood that the methods for division of scheduling periods listed above, that is, the number of divided scheduling periods is only one embodiment of the present invention, and other methods that can determine the priority station, other used parameters, and other numbers of divided scheduling periods all fall within the protection scope of the present invention.

Optionally, in this embodiment of the present invention, the acquiring second indication information includes:

receiving the first beacon frame that is sent by the access point and includes the second indication information, where the second indication information is used for indicating a length of the scheduling period;

acquiring the second indication information from the first beacon frame; and the determining the scheduling period according to the second indication information includes:

determining the length of the scheduling period according to the second indication information;

determining the number of stations that need to transmit data before the first station of the stations indicated by the TIM included in the first beacon frame; and determining the scheduling period according to the length of the scheduling period and the number of stations that need to transmit data before the first station of the stations indicated by the TIM.

Moreover, in this embodiment of the present invention, the determining the number of stations that need to transmit data before the first station of the stations indicated by the TIM includes:

determining, according to the TIM, the number of stations that need to transmit data before the first station of the stations indicated by the TIM.

Specifically:

In this embodiment of the present invention, as the access point periodically sends the first beacon frame to all stations, the access point may use the first beacon frame to carry the indication information (an example of the second indication information) for indicating the scheduling period (including the length of the scheduling period and the start time of the scheduling period). In this case, the access point may negotiate with the stations to enable the first station of the stations to determine that the first station needs to acquire the second indication information from the first beacon frame. As an example rather than a limitation, the access point sends a message to the first station to indicate that the first station needs to acquire the second indication information from the first beacon frame.

For another example, it may be specified that: the station (an example of the first station) that needs to transmit data within the sending period of the first beacon frame needs to acquire the second indication information from the first beacon frame. In addition, it may also be specified that: a station (another example of the first station) that does not need to transmit data within the sending period of the first beacon frame needs to acquire the first indication information from the first beacon frame.

Moreover, in this case, the station may determine, according to the TIM included in the first beacon frame, whether data needs to be transmitted within the sending period of the first beacon frame.

In this embodiment of the present invention, the access point may determine that the scheduling periods allocated to the first stations have a same duration, and only deliver, to the access point, indication information (another example of the second indication information) indicating a duration of the scheduling period. Therefore, the first station may calculate a start point of the scheduling period according to an arrangement order of the first station in the TIM and the duration of the scheduling period. For example, the duration of the scheduling period is set to T, and if one station (an example of the first station) that needs to transmit data within a period of the first beacon frame discovers that before the station there are K stations that need to transmit data within the period of the first beacon frame, the start point of the time segment in which the station is scheduled may be $(K+n)*T+T0$, where n is a scheduling time segment offset introduced in consideration of some special cases (for example, a collision may occur within the first scheduling time segment because an ordinary station selects 0 time length as a backoff time), and T0 is an amount of offset of the scheduling time segment relative to a time reference point (for example, an end time of the first beacon frame).

In this case, the first station needs to learn the number of stations that need to transmit data before the first station in the TIM; because in a layered TIM compression structure, a station that needs to transmit data needs to sequentially parse all blocks before the station to make a count, and because a different compression manner is used for each block, the count process is relatively troublesome. Therefore, in this embodiment of the present invention, when the first station needs to transmit data within the sending period of the first beacon frame, the access point may deliver, to the first station, indication information (an example of fourth indication information) for indicating the number of stations that need to transmit data in each block in the TIM included in the first beacon frame. In this manner, the first station may rapidly and conveniently count the stations that need to transmit data before the first station, so as to determine the scheduling period rapidly.

Optionally, in this embodiment of the present invention, the scheduling period is determined by the access point according to the sending period of the first beacon frame, where the second indication information is used for indicating the duration of the scheduling period, the number of scheduling periods included in the sending period is less than or equal to the number of stations that need to send data in blocks in the TIM included in the first beacon frame, or the number of scheduling periods included in the sending period is less than or equal to the number of stations that do not need to send data in blocks in the TIM included in the first beacon frame; and the method further includes:

acquiring fourth indication information from a second field in at least one block included in the TIM, where the fourth indication information is used for indicating the number of stations, which need to transmit data, of stations indicated by blocks in the TIM;

the determining the number of stations that need to transmit data before the first station of the stations indicated by the TIM, includes:

determining, according to the fourth indication information, the number of stations that need to transmit data before the first station of the stations indicated by the TIM.

Specifically, the access point may add one piece of indication information to each block to indicate the number of scheduled stations in the block. Moreover, multiple blocks may also be bound together to indicate a total sum of the numbers of scheduled stations included in the blocks. In this manner, a scheduled station only needs to make simple summation to obtain the number of scheduled stations in all blocks before the station.

In this manner, by adding one field into at least one block in an existing TIM, the access point does not need to indicate whether the station has downlink data within the sending period of the first beacon frame by using an independent message or independent indication information, thereby improving practicability of this embodiment of the present invention.

For a method for controlling data transmission according to this embodiment of the present invention, shortening backoff durations of some stations can ensure that these stations send data first, thereby reducing occurrence of collisions with other stations, and extending backoff durations of some stations can ensure that the other stations send data first, thereby reducing occurrence of collisions with these stations. Therefore, occurrence of collisions can be reduced.

In the foregoing, the methods for controlling data transmission according to the embodiments of the present invention are described in detail with reference to FIG. 1 and FIG. 2. In the following, an apparatus for controlling data transmission according to an embodiment of the present invention is described in detail. Specifically, an access point and a station in a wireless local area network may implement the foregoing data transmission method.

Figure 3A:
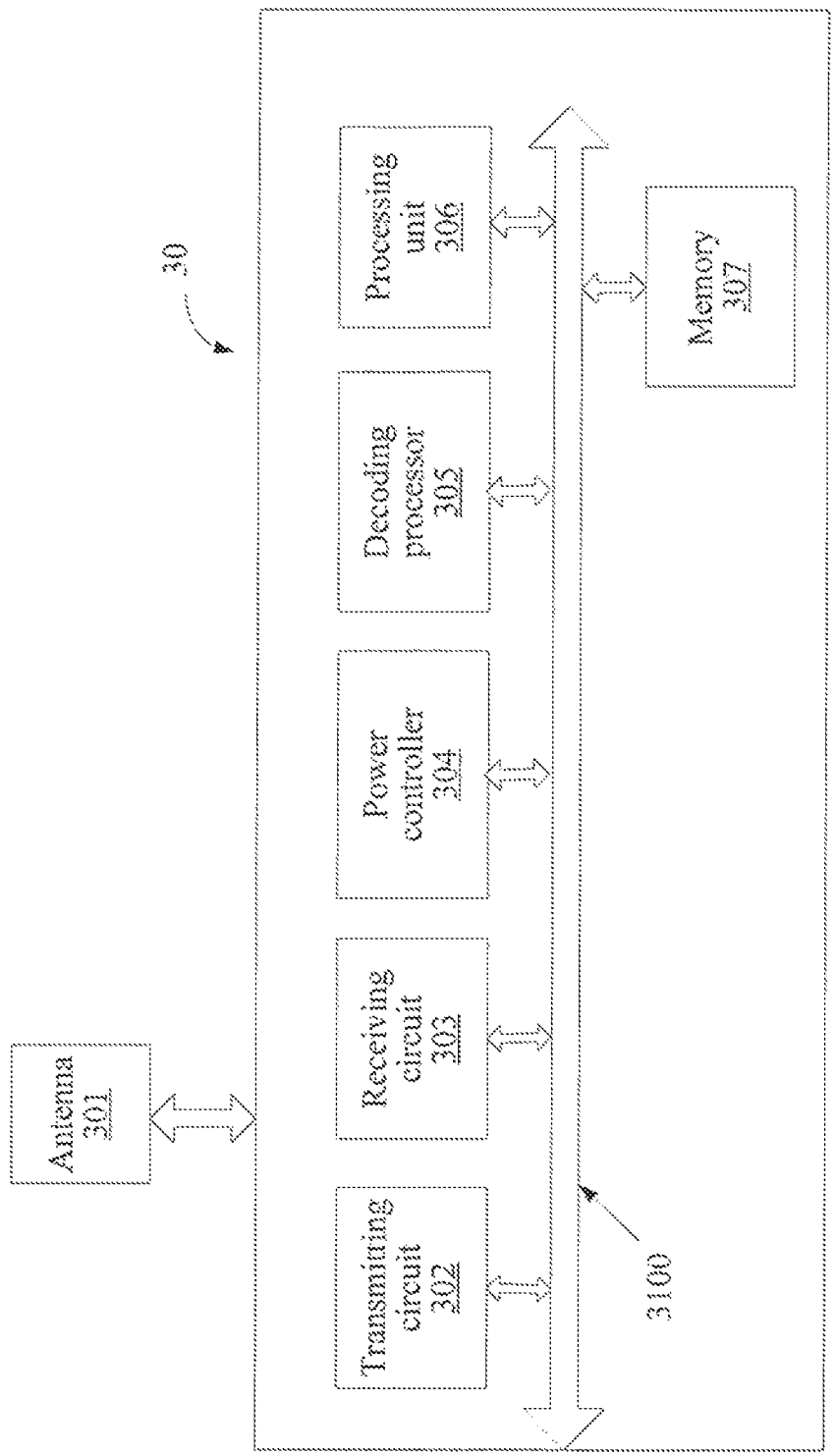
FIG. 3a is a schematic structural diagram of an apparatus for controlling data transmission according to an embodiment of the present invention.

Referring to FIG. 3a, an embodiment of the present invention further provides an apparatus embodiment for implementing steps and methods in the foregoing method embodiments. This embodiment of the present invention is applicable to an access point or a user station (terminal) in various wireless local area networks. FIG. 3a shows an embodiment of a station device. In this embodiment, a device 30 includes a transmitting circuit 302, a receiving circuit 303, a power controller 304, a decoding processor 305, a processing unit 306, a memory 307, and an antenna 301. The processing unit 306 controls an operation of the device 30; the processing unit 306 may further be referred to as a CPU. The memory 307 may include a read-only memory and a random access memory, and provide an instruction and data to the processing unit 306. A part of the memory 307 may further include a non-volatile random access memory (NVRAM). In a specific application, the device 30 may be built in or may be a wireless communications device such as a mobile phone, and may further include a carrier for accommodating the transmitting circuit 302 and the receiving circuit 303, so as to allow data transmission and reception between the device 30 and a remote position. The transmitting circuit 302 and the receiving circuit 303 may be coupled to the antenna 301. Components of the device 30 are coupled together by using a bus system 3100, where the bus system 3100 further include, in addition to a data bus, a power supply bus, a control bus, and a status signal bus. However, for simplicity, all buses in the drawing are labeled as the bus system 3100. The device 30 may further include the processing unit 306 configured to process a signal, and additionally further include the power controller 304 and the decoding processor 305. The decoder 305 in specific different products may be integrated with the processing unit 306.

The processor may implement or execute steps and logical block diagrams disclosed in the method embodiments of the present invention. A general purpose processor may be a microprocessor or the processor may also be any conventional processor, decoder, and the like. Steps of the methods disclosed with reference to the embodiments of the present invention may be directly executed and accomplished by means of a hardware processor, or may be executed and accomplished by using a combination of hardware and software modules in the decoding processor. The software module may be located in a mature storage medium in the field, such as a random access memory, a flash memory, a read-only memory, a programmable read-only memory, an electrically-erasable programmable memory or a register. The storage medium is located in the memory 307, and a decoding unit or processing unit reads information in the memory 307 and accomplishes the steps in the foregoing methods in combination with hardware of the decoding unit or processing unit.

Figure 3B:
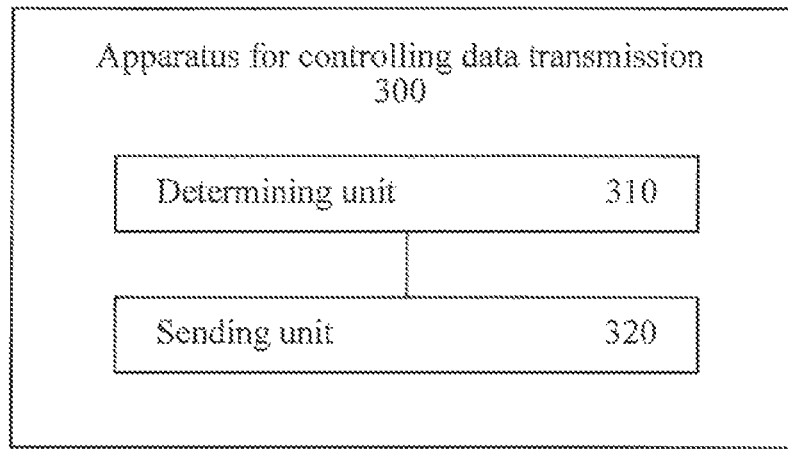
FIG. 3b is a schematic block diagram of an apparatus for controlling data transmission according to an embodiment of the present invention.

FIG. 3b is a schematic block diagram of an apparatus 300 for controlling data transmission according to an embodiment of the present invention specifically explained from the perspective of an access point. As shown in FIG. 3b, the apparatus 300 includes:

a determining unit 310, configured to determine at least one first station, and may be a part of the processing unit foregoing processing unit 306 or may be one separate processing unit; and a sending unit 320, configured to send first indication information to the first station, where the first indication information is used for indicating at least one first backoff duration, so that the first station performs a data transmission operation by using the first backoff duration, and the first backoff duration used by the first station to perform a data transmission operation is less than a second backoff duration used by a second station to perform a data transmission operation, or the first backoff duration used by the first station to perform a data transmission operation is greater than the second backoff duration used by the second station to perform a data transmission operation; and the sending unit is the foregoing transmitting circuit or a part of the transmitting circuit.

Optionally, in this embodiment of the present invention, a statistical average value of the first backoff duration that is indicated by the first indication information sent by the sending unit 320 and is used by the first station to perform a data transmission operation is less than a statistical average value of the second backoff duration used by the second station to perform a data transmission operation; or a statistical average value of the first backoff duration that is indicated by the first indication information sent by the sending unit 320 and is used by the first station to perform a data transmission operation is greater than a statistical average value of the second backoff duration used by the second station to perform a data transmission operation.

Optionally, in this embodiment of the present invention, the determining unit 310 is further configured to determine a scheduling period.

The sending unit 320 is further configured to send second indication information to the at least one first station, where the second indication information is used for indicating the scheduling period, so that the first station performs a data transmission operation by using the first backoff duration within the scheduling period.

Optionally, in this embodiment of the present invention, the determining unit 310 is specifically configured to determine a station that needs to transmit data within a sending period of a first beacon frame as the first station; and the sending unit 320 is specifically configured to send the first indication information to the first station by using the first beacon frame, so that the first station determines, according to a traffic indication map TIM included in the first beacon frame, that data needs to be transmitted within the sending period of the first beacon frame, and then acquires the first indication information from the first beacon frame; or the determining unit 310 is specifically configured to determine a station that does not need to transmit data within a sending period of a first beacon frame as the first station; and the sending unit 320 is specifically configured to send the first indication information to the first station by using the first beacon frame, so that the at least one first station determines, according to a TIM included in the first beacon frame, that no data needs to be transmitted within the sending period of the first beacon frame, and then acquires the first indication information from the first beacon frame.

Optionally, in this embodiment of the present invention, the sending unit 320 is further configured to send third indication information to the first station by using the first beacon frame, where the third indication information is used for indicating whether a station that needs to transmit data within the sending period of the first beacon frame exists in stations indicated by blocks in the TIM, and the third indication information is carried in a first field in a page in the TIM.

Optionally, in this embodiment of the present invention, the determining unit 310 is specifically configured to determine the scheduling period according to the sending period of the first beacon frame.

Optionally, in this embodiment of the present invention, the determining unit 310 is specifically configured to determine a station that needs to transmit data within the sending period of the first beacon frame as the first station; or configured to determine a station that does not need to transmit data within the sending period of the first beacon frame as the first station; and configured to determine the scheduling period according to the sending period of the first beacon frame, where the number of scheduling periods included in the sending period is less than or equal to the number of first stations.

Optionally, in this embodiment of the present invention, the determining unit 310 is specifically configured to determine a station that needs to transmit data within the sending period of the first beacon frame as the first station; and the sending unit 320 is specifically configured to send the second indication information to the first station by using the first beacon frame, where the second indication information is used for indicating a length of the scheduling period, so that the at least one first station determines the scheduling period according to the length of the scheduling period and the number of stations that need to transmit data before the first station of the stations indicated by the TIM included in the first beacon frame.

Optionally, in this embodiment of the present invention, the sending unit 310 further sends fourth indication information to the first station by using the first beacon frame, where the fourth indication information is used for indicating the number of stations, which need to transmit data, of the stations indicated by the blocks in the TIM, and the fourth indication information is carried in a second field in at least one block in the TIM.

Optionally, in this embodiment of the present invention, the sending unit 310 is specifically configured to send the first indication information to at least two first stations, where first backoff durations indicated by the first indication information sent to the first stations are same or different.

For an apparatus for controlling data transmission according to this embodiment of the present invention, shortening backoff durations of some stations can ensure that these stations send data first, thereby reducing occurrence of collisions with other stations, and extending backoff durations of some stations can ensure that the other stations send data first, thereby reducing occurrence of collisions with these stations. Therefore, occurrence of collisions can be reduced.

The apparatus 300 for controlling data transmission according to the embodiment of the present invention may correspond to the access point in the method according to the embodiment of the present invention, and the units in the apparatus 300 for controlling data transmission and the foregoing other operations and/or functions are used to implement corresponding procedures in the method 100 in FIG. 1 separately, which are no longer elaborated herein for simplicity.

Figure 4:
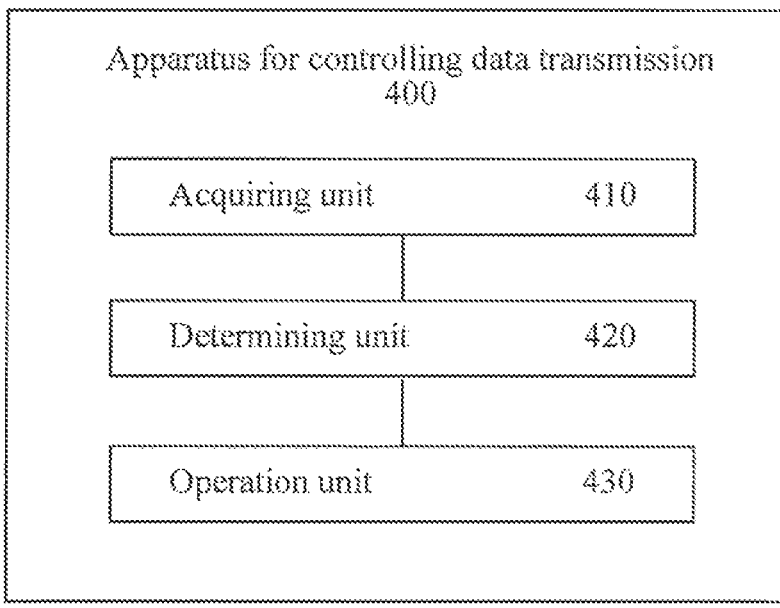
FIG. 4 is a schematic block diagram of an apparatus for controlling data transmission according to another embodiment of the present invention.

FIG. 4 is a schematic block diagram of an apparatus 400 for controlling data transmission according to an embodiment of the present invention as explained from the perspective of a station (a first station). As shown in FIG. 4, the apparatus 400 includes:

an acquiring unit 410, configured to enable a first station to acquire first indication information, where the first indication information is used for indicating at least one first backoff duration;

a determining unit 420, configured to determine the first backoff duration according to the first indication information; and an operation unit 430, configured to perform a data transmission operation by using the first backoff duration, where the first backoff duration used by the first station to perform a data transmission operation is less than a second backoff duration used by a second station to perform a data transmission operation, or the first backoff duration used by the first station to perform a data transmission operation is greater than the second backoff duration used by the second station to perform a data transmission operation. In a specific product form, the acquiring unit 410, the determining unit 420, and the operation unit 430 in the foregoing may each be one independent processing unit 306, or the acquiring unit 410, the determining unit 420, and the operation unit 430 may be integrated in one logic processing unit 306.

Optionally, in this embodiment of the present invention, a statistical average value of the first backoff duration that is indicated by the first indication information acquired by the acquiring unit 410 and is used by the first station to perform a data transmission operation is less than a statistical average value of the second backoff duration used by the second station to perform a data transmission operation; or a statistical average value of the first backoff duration that is indicated by the first indication information acquired by the acquiring unit 410 and is used by the first station to perform a data transmission operation is greater than a statistical average value of the second backoff duration used by the second station to perform a data transmission operation.

Optionally, in this embodiment of the present invention, the acquiring unit 410 is further configured to acquire second indication information, where the second indication information is used for indicating a scheduling period;

the determining unit 420 is further configured to determine the scheduling period according to the second indication information; and the control unit 430 is further configured to perform the data transmission operation by using the first backoff duration within the scheduling period.

Optionally, in this embodiment of the present invention, the control unit 430 is further configured to forbid data sending before the scheduling period.

Optionally, in this embodiment of the present invention, the acquiring unit 410 is specifically configured to receive a first beacon frame that is sent by the access point and includes the first indication information;

configured to determine that data needs to be transmitted within a sending period of the first beacon frame; or configured to determine that no data needs to be transmitted within a sending period of the first beacon frame; and configured to acquire the first indication information from the first beacon frame.

Optionally, in this embodiment of the present invention, the acquiring unit 410 is specifically configured to determine, according to a traffic indication map TIM included in the first beacon frame, that data needs to be transmitted within the sending period of the first beacon frame; or configured to determine, according to a TIM included in the first beacon frame, that no data needs to be transmitted within the sending period of the first beacon frame.

Optionally, in this embodiment of the present invention, the acquiring unit 410 is further configured to acquire third indication information from a first field in a page in the TIM included in the first beacon frame, where the third indication information is used for indicating whether a station that needs to transmit data within the sending period of the first beacon frame exists in stations indicated by blocks in the TIM;

configured to determine, according to the third indication information and the TIM, that data needs to be transmitted within the sending period of the first beacon frame; or configured to determine, according to the third indication information, that no data needs to be transmitted within the sending period of the first beacon frame.

Optionally, in this embodiment of the present invention, the acquiring unit 410 is specifically configured to receive the first beacon frame that is sent by the access point and includes the second indication information, where the second indication information is used for indicating a length of the scheduling period;

configured to acquire the second indication information from the first beacon frame; and the determining unit 420 is specifically configured to determine the length of the scheduling period according to the second indication information;

configured to determine the number of stations that need to transmit data before the first station of the stations indicated by the TIM included in the first beacon frame; and configured to determine the scheduling period according to the length of the scheduling period and the number of stations that need to transmit data before the first station of the stations indicated by the TIM.

Optionally, in this embodiment of the present invention, the determining unit 420 is specifically configured to determine, according to the TIM, the number of stations that need to transmit data before the first station of the stations indicated by the TIM.

Optionally, in this embodiment of the present invention, the acquiring unit 410 is further configured to acquire fourth indication information from a second field in at least one block included in the TIM, where the fourth indication information is used for indicating the number of stations, which need to transmit data, of the stations indicated by the blocks in the TIM; and the determining unit 420 is specifically configured to determine, according to the fourth indication information, the number of stations that need to transmit data before the first station of the stations indicated by the TIM.

For an apparatus for controlling data transmission according to this embodiment of the present invention, shortening backoff durations of some stations can ensure that these stations send data first, thereby reducing occurrence of collisions with other stations, and extending backoff durations of some stations can ensure that the other stations send data first, thereby reducing occurrence of collisions with these stations. Therefore, occurrence of collisions can be reduced.

The apparatus 400 for controlling data transmission according to the embodiment of the present invention may correspond to the station (the first station) in the method according to the embodiment of the present invention, and the units in the apparatus 400 for controlling data transmission and the foregoing other operations and/or functions are used to implement corresponding procedures in the method 200 in FIG. 2 separately, which are no longer elaborated herein for simplicity.

FIG. 5 is a schematic flowchart of a method 500 for controlling data transmission according to an embodiment of the present invention as described from the perspective of an access point. As shown in FIG. 5, the method 500 includes:

S510. Determine whether a station that needs to transmit data within a sending period of a first beacon frame exists in user stations indicated by blocks in a traffic indication map TIM included in the first beacon frame.

S520. Determine a first field in a page in the TIM, where the first field carries third indication information, and the third indication information is used for indicating whether a station that needs to transmit data within the sending period of the first beacon frame exists in the stations indicated by the blocks in the TIM.

S530. Send the beacon frame.

Specifically, when needing to determine, according to the TIM in one beacon frame (the first beacon frame), whether data needs to be sent within the sending period of the beacon frame, the station needs to parse the TIM. Generally, a bitmap in the TIM may be divided into three levels: a page, a block, and a sub-block. A bitmap corresponding to all stations may be divided into several pages, each page may include several blocks, each block may include several sub-blocks, each sub-block may include several bits (length), and each bit indicates one station. In this manner, an AID of each station may be indexed by a page identifier, a block identifier, a sub-block identifier, and a bit location identifier of the AID in a corresponding sub-block. In this case, a TIM part in the first beacon frame includes a page field, a block offset field, a block control field, a block bitmap field, and a sub-block bitmap field. The page field indicates a page in which a station having downlink data is located in the bitmap, the block offset field indicates an amount of offset of a block in which the station is located in the page, the block control field indicates a manner used in current beacon transmission, the block bitmap field indicates a map location of a sub-block in which the station having downlink data is located in the block to which the sub-block belongs, and the sub-block bitmaps field indicates which bit is 1 specifically. Generally, a bit in the block bitmap field being 0 represents that none of the stations in the sub-block corresponding to the bit has downlink data to receive, and the bit being 1 represents that at least one station in the corresponding sub-block has downlink data that needs to be sent. When the number of 1s included in the block bitmap field is n, the TIM part in the beacon frame carries n sub-blocks, and each bit in each sub-block indicates a case of downlink data of a corresponding station, where the bit being 0 represents that no data needs to be transmitted, and the bit being 1 represents that data needs to be transmitted.

Because the station determines based on the TIM in the beacon frame whether data needs to be sent within the sending period of the beacon frame, the station needs to first sequentially needs to search for bits of a page, block, and sub-block to which the station belongs to determine whether the station has data; and the length of each block is not fixed, and if in the entire block, no station has data, the block may not appear in the TIM. In this case, one station needs to parse all blocks at one time in a corresponding page to determine whether a block is the block that the station belongs to, and determines a start location of a next block according to a structure of the block. The entire monitoring process is serially performed, and is therefore relatively troublesome.

Therefore, in this embodiment of the present invention, the access point may deliver, to the station, information (the third indication information) used for indicating whether a station that needs to transmit data within the sending period of the first beacon frame exists in the stations indicated by the blocks in the TIM. Moreover, as an example rather than a limitation, the access point may add one page bitmap to each page, where each block corresponds to one bit in the page bit map; when a bit is set to 1, it represents that at least one station in the block has data or is scheduled; when the bit is set to 0, it represents that none of the stations in the block has data or is scheduled.

Therefore, when a station discovers that a bit corresponding to a block to which the station belongs to in the page bitmap is set to 0, the station learns that the station does not have downlink data within the sending period of the first beacon frame, so that the station does not need to further parse any block.

Therefore, by adding a page bitmap into an existing TIM, the station can rapidly and conveniently learn whether a station that needs to transmit data within the sending period of the beacon frame exists in a block including the station.

FIG. 6 is a schematic flowchart of a method 600 for controlling data transmission according to an embodiment of the present invention as described from the perspective of a station. As shown in FIG. 6, the method 600 includes:

S610. Receive a first beacon frame including a traffic indication map TIM, where a first field in a page in the TIM carries third indication information, and the third indication information is used for indicating whether a station that needs to transmit data within a sending period of the first beacon frame exists in stations indicated by blocks in the TIM.

S620. Acquire the third indication information from the first field.

S630. Determine, according to the third indication information, whether a station that needs to transmit data within the sending period of the first beacon frame exists in the stations indicated by the blocks in the TIM.

Specifically, when needing to determine, according to the TIM in one beacon frame (the first beacon frame), whether data needs to be sent within the sending period of the beacon frame, the station needs to parse the TIM. Generally, a bitmap in the TIM may be divided into three levels: a page, a block, and a sub-block. A bitmap corresponding to all stations may be divided into several pages, each page may include several blocks, each block may include several sub-blocks, each sub-block may include several bits (length), and each bit indicates one station. In this manner, an AID of each station may be indexed by a page identifier, a block identifier, a sub-block identifier, and a bit location identifier of the AID in a corresponding sub-block. In this case, a TIM part in the first beacon frame includes a page field, a block offset field, a block control field, a block bitmap field, and a sub-block bitmap field. The page field indicates a page in which a station having downlink data is located in the bitmap, the block offset field indicates an amount of offset of a block in which the station is located in the page, the block control field indicates a manner used in current beacon transmission, the block bitmap field indicates a map location of a sub-block in which the station having downlink data is located in the block to which the sub-block belongs, and the sub-block bitmaps field indicates which bit is 1 specifically. Generally, a bit in the block bitmap field being 0 represents that none of the stations in the sub-block corresponding to the bit has downlink data to receive, and the bit being 1 represents that at least one station in the corresponding sub-block has downlink data that needs to be sent. When the number of 1s included in the block bitmap field is n, the TIM part in the beacon frame carries n sub-blocks, and each bit in each sub-block indicates a case of downlink data of a corresponding station, where the bit being 0 represents that no data needs to be transmitted, and the bit being 1 represents that data needs to be transmitted.

Because the station determines based on the TIM in the beacon frame whether data needs to be sent within the sending period of the beacon frame, the station needs to first sequentially needs to search for bits of a page, block, and sub-block to which the station belongs to determine whether the station has data; and the length of each block is not fixed, and if in the entire block, no station has data, the block may not appear in the TIM. In this case, one station needs to parse all blocks at one time in a corresponding page to determine whether a block is the block that the station belongs to, and determines a start location of a next block according to a structure of the block. The entire monitoring process is serially performed, and is therefore relatively troublesome.

Therefore, in this embodiment of the present invention, the access point may deliver, to the station, information (the third indication information) used for indicating whether a station that needs to transmit data within the sending period of the first beacon frame exists in the stations indicated by the blocks in the TIM. Moreover, as an example rather than a limitation, the access point may add one page bitmap to each page, where each block corresponds to one bit in the page bit map; when a bit is set to 1, it represents that at least one station in the block has data or is scheduled; when the bit is set to 0, it represents that none of the stations in the block has data or is scheduled.

Therefore, when a station discovers that a bit corresponding to a block to which the station belongs to in the page bitmap is set to 0, the station learns that the station does not have downlink data within the sending period of the first beacon frame, so that the station does not need to further parse any block.

Therefore, by adding a page bitmap into an existing TIM, the station can rapidly and conveniently learn whether a station that needs to transmit data within the sending period of the beacon frame exists in a block including the station.

Figure 7:
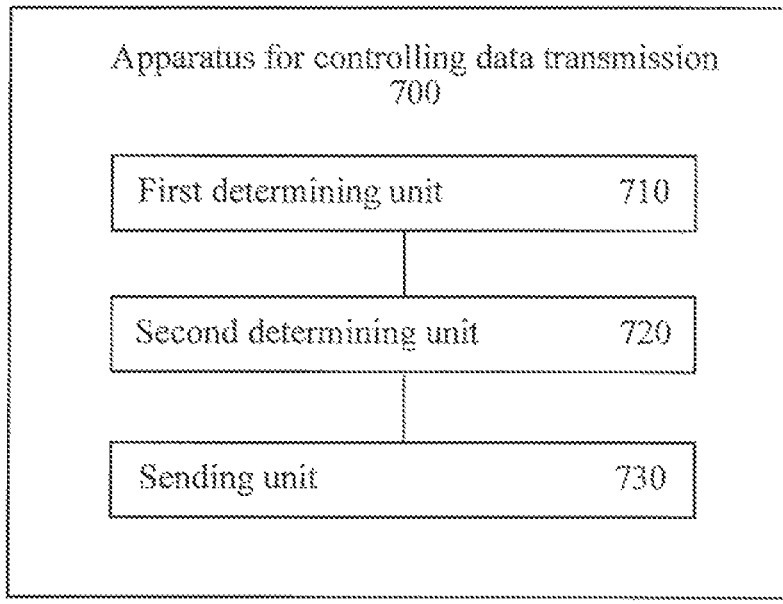
FIG. 7 is a schematic block diagram of an apparatus for controlling data transmission according to yet another embodiment of the present invention.

FIG. 7 is a schematic block diagram of an apparatus 700 for controlling data transmission according to an embodiment of the present invention as explained from the perspective of an access point. As shown in FIG. 7, the apparatus 700 includes:

a first determining unit 710, configured to determine whether a station that needs to transmit data within a sending period of a first beacon frame exists in user stations indicated by blocks in a traffic indication map TIM included in the first beacon frame;

a second determining unit 720, configured to determine a first field in a page in the TIM, where the first field carries third indication information, and the third indication information is used for indicating whether a station that needs to transmit data within the sending period of the first beacon frame exists in the stations indicated by the blocks in the TIM; and a sending unit 730, configured to send the beacon frame.

Therefore, by adding a page bitmap into an existing TIM, the station can rapidly and conveniently learn whether a station that needs to transmit data within the sending period of the beacon frame exists in a block including the station.

The apparatus 700 for controlling data transmission according to the embodiment of the present invention may correspond to the implementation body (the access point) of the method 500 according to the embodiment of the present invention, and the units in the apparatus 700 for controlling data transmission and the foregoing other operations and/or functions are used to implement corresponding procedures in the method 500 separately, which are no longer elaborated herein for simplicity.

Figure 8:
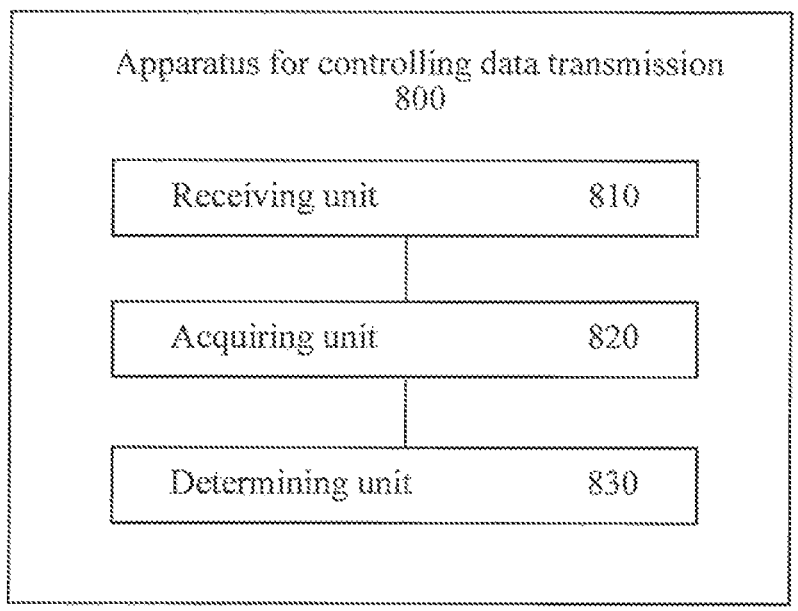
FIG. 8 is a schematic block diagram of an apparatus for controlling data transmission according to yet another embodiment of the present invention.

FIG. 8 is a schematic block diagram of an apparatus 800 for controlling data transmission according to an embodiment of the present invention as explained from the perspective of a station. As shown in FIG. 8, the apparatus 800 includes:

a receiving unit 810, configured to receive a first beacon frame including a traffic indication map TIM, where a first field in a page in the TIM carries third indication information, and the third indication information is used for indicating whether a station that needs to transmit data within a sending period of the first beacon frame exists in stations indicated by blocks in the TIM;

an acquiring unit 820, configured to acquire the third indication information from the first field; and a determining unit 830, determining, according to the third indication information, whether a station that needs to transmit data within the sending period of the first beacon frame exists in the stations indicated by the blocks in the TIM.

Therefore, by adding a page bitmap into an existing TIM, the station can rapidly and conveniently learn whether a station that needs to transmit data within the sending period of the beacon frame exists in a block including the station.

The apparatus 800 for controlling data transmission according to the embodiment of the present invention may correspond to the implementation body (the station) of the method 600 according to the embodiment of the present invention, and the units in the apparatus 800 for controlling data transmission and the foregoing other operations and/or functions are used to implement corresponding procedures in the method 600 separately, which are no longer elaborated herein for simplicity.

Figure 9:
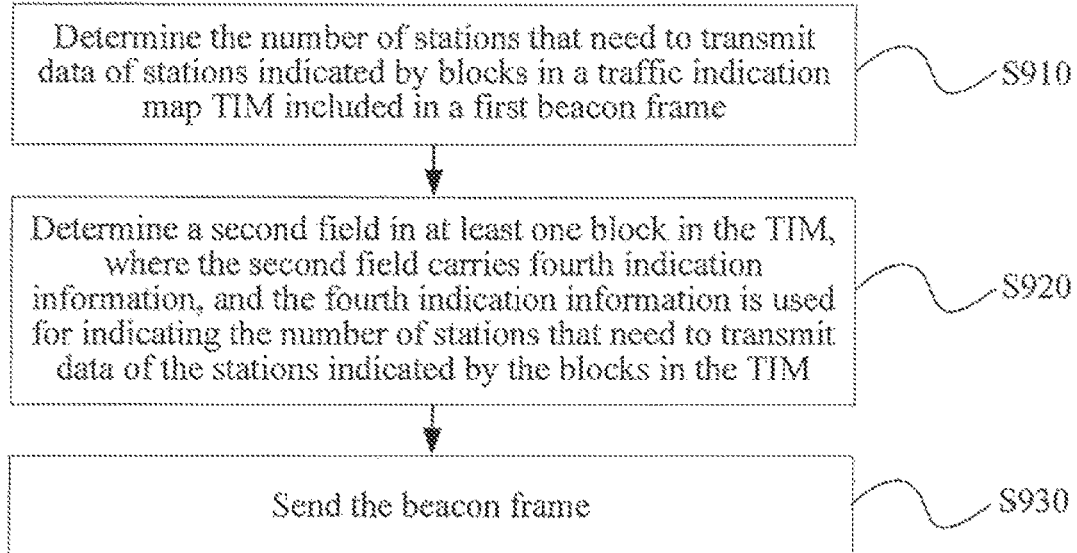
FIG. 9 is a schematic flowchart of a method for controlling data transmission according to yet another embodiment of the present invention

FIG. 9 is a schematic flowchart of a method 900 for controlling data transmission according to an embodiment of the present invention as described from the perspective of an access point. As shown in FIG. 9, the method 900 includes:

S910. Determine the number of stations, which need to transmit data, of stations indicated by blocks in a traffic indication map TIM included in a first beacon frame.

S920. Determine a second field in at least one block in the TIM, where the second field carries fourth indication information, and the fourth indication information is used for indicating the number of stations, which need to transmit data, of the stations indicated by the blocks in the TIM.

S930. Send the beacon frame.

Specifically, generally, a bitmap in the TIM may be divided into three levels: a page, a block, and a sub-block. A bitmap corresponding to all stations may be divided into several pages, each page may include several blocks, each block may include several sub-blocks, each sub-block may include several bits (length), and each bit indicates one station. In this manner, an AID of each station may be indexed by a page identifier, a block identifier, a sub-block identifier, and a bit location identifier of the AID in a corresponding sub-block. In this case, a TIM part in the first beacon frame includes a page field, a block offset field, a block control field, a block bitmap field, and a sub-block bitmap field. The page field indicates a page in which a station having downlink data is located in the bitmap, the block offset field indicates an amount of offset of a block in which the station is located in the page, the block control field indicates a manner used in current beacon transmission, the block bitmap field indicates a map location of a sub-block in which the station having downlink data is located in the block to which the sub-block belongs, and the sub-block bitmaps field indicates which bit is 1 specifically. Generally, a bit in the block bitmap field being 0 represents that none of the stations in the sub-block corresponding to the bit has downlink data to receive, and the bit being 1 represents that at least one station in the corresponding sub-block has downlink data that needs to be sent. When the number of 1s included in the block bitmap field is n, the TIM part in the beacon frame carries n sub-blocks, and each bit in each sub-block indicates a case of downlink data of a corresponding station, where the bit being 0 represents that no data needs to be transmitted, and the bit being 1 represents that data needs to be transmitted.

If the station needs to learn the number of stations that need to transmit data before the station in the TIM, in a layered TIM compression structure, a station that needs to transmit data needs to sequentially parse all blocks before the station to make a count; because a different compression manner is used for each block, the count process is relatively troublesome. Therefore, the access point may add one piece of indication information to each block to indicate the number of scheduled stations in the block. Moreover, multiple blocks may also be bound together to indicate a total sum of the numbers of scheduled stations included in the blocks. In this manner, a scheduled station only needs to make simple summation to obtain the number of scheduled stations in all blocks before the station.

Therefore, by adding one field into at least one block in an existing TIM, the station can rapidly and conveniently learn the number of stations that need to send data within a period of a current beacon frame.

Figure 10:
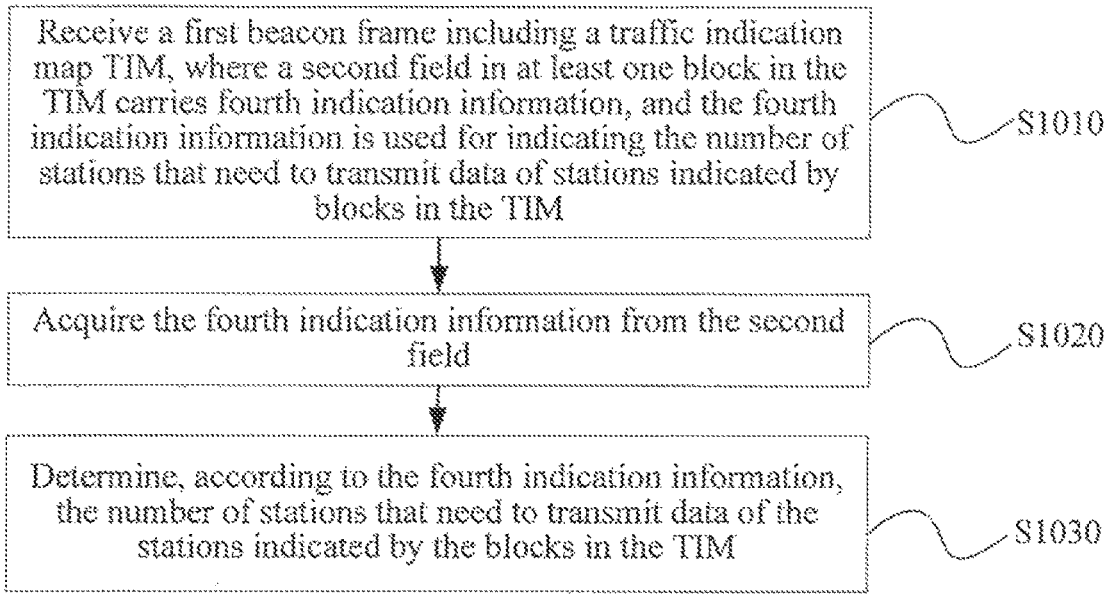
FIG. 10 is a schematic flowchart of a method for controlling data transmission according to yet another embodiment of the present invention.

FIG. 10 is a schematic flowchart of a method 1000 for controlling data transmission according to an embodiment of the present invention as described from the perspective of a station. As shown in FIG. 10, the method 1000 includes:

S1010. Receive a first beacon frame including a traffic indication map TIM, where a second field in at least one block in the TIM carries fourth indication information, and the fourth indication information is used for indicating the number of stations, which need to transmit data, of stations indicated by blocks in the TIM.

S1020. Acquire the fourth indication information from the second field.

S1030. Determine, according to the fourth indication information, the number of stations, which need to transmit data, of the stations indicated by the blocks in the TIM.

Specifically, generally, a bitmap in the TIM may be divided into three levels: a page, a block, and a sub-block. A bitmap corresponding to all stations may be divided into several pages, each page may include several blocks, each block may include several sub-blocks, each sub-block may include several bits (length), and each bit indicates one station. In this manner, an AID of each station may be indexed by a page identifier, a block identifier, a sub-block identifier, and a bit location identifier of the AID in a corresponding sub-block. In this case, a TIM part in the first beacon frame includes a page field, a block offset field, a block control field, a block bitmap field, and a sub-block bitmap field. The page field indicates a page in which a station having downlink data is located in the bitmap, the block offset field indicates an amount of offset of a block in which the station is located in the page, the block control field indicates a manner used in current beacon transmission, the block bitmap field indicates a map location of a sub-block in which the station having downlink data is located in the block to which the sub-block belongs, and the sub-block bitmaps field indicates which bit is 1 specifically. Generally, a bit in the block bitmap field being 0 represents that none of the stations in the sub-block corresponding to the bit has downlink data to receive, and the bit being 1 represents that at least one station in the corresponding sub-block has downlink data that needs to be sent. When the number of 1s included in the block bitmap field is n, the TIM part in the beacon frame carries n sub-blocks, and each bit in each sub-block indicates a case of downlink data of a corresponding station, where the bit being 0 represents that no data needs to be transmitted, and the bit being 1 represents that data needs to be transmitted.

If the station needs to learn the number of stations that need to transmit data before the station in the TIM, in a layered TIM compression structure, a station that needs to transmit data needs to sequentially parse all blocks before the station to make a count; because a different compression manner is used for each block, the count process is relatively troublesome. Therefore, the access point may add one piece of indication information to each block to indicate the number of scheduled stations in the block. Moreover, multiple blocks may also be bound together to indicate a total sum of the numbers of scheduled stations included in the blocks. In this manner, a scheduled station only needs to make simple summation to obtain the number of scheduled stations in all blocks before the station.

Therefore, by adding one field into at least one block in an existing TIM, the station can rapidly and conveniently learn the number of stations that need to send data within a period of a current beacon frame.

Figure 11:
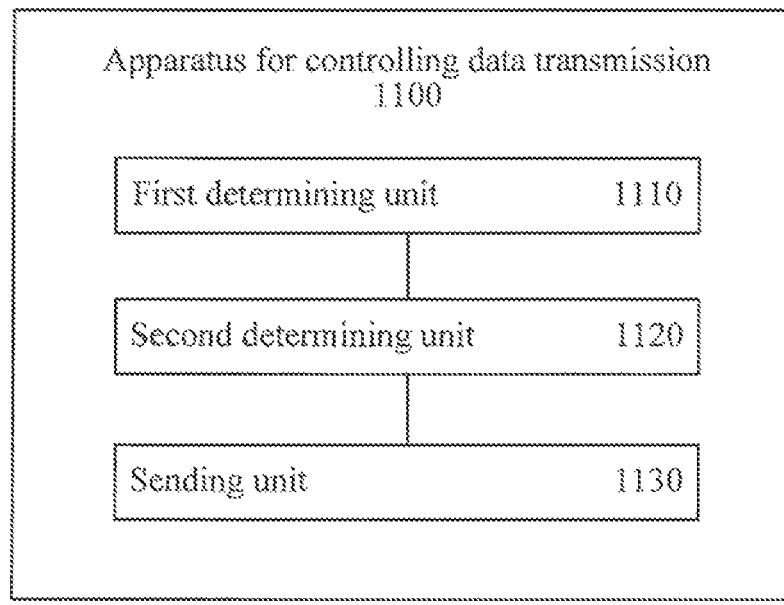
FIG. 11 is a schematic block diagram of an apparatus for controlling data transmission according to yet another embodiment of the present invention.

FIG. 11 is a schematic block diagram of an apparatus 1100 for controlling data transmission according to an embodiment of the present invention as explained from the perspective of an access point. As shown in FIG. 11, the apparatus 1100 includes:

a first determining unit 1110, configured to determine the number of stations, which need to transmit data, of stations indicated by blocks in a traffic indication map TIM included in a first beacon frame;

a second determining unit 1120, configured to determine a second field in at least one block in the TIM, where the second field carries fourth indication information, and the fourth indication information is used for indicating the number of stations, which need to transmit data, of the stations indicated by the blocks in the TIM; and a sending unit 1130, configured to send the beacon frame.

Therefore, by adding one field into at least one block in an existing TIM, the station can rapidly and conveniently learn the number of stations that need to send data within a period of a current beacon frame.

The apparatus 1100 for controlling data transmission according to the embodiment of the present invention may correspond to the implementation body (the access point) of the method 900 according to the embodiment of the present invention, and the units in the apparatus 1100 for controlling data transmission and the foregoing other operations and/or functions are used to implement corresponding procedures in the method 900 separately, which are no longer elaborated herein for simplicity.

Figure 12:
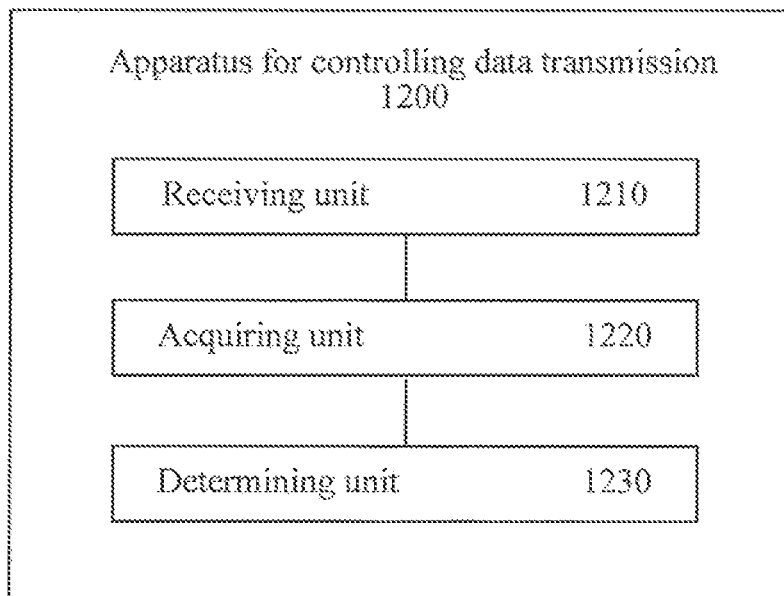
FIG. 12 is a schematic block diagram of an apparatus for controlling data transmission according to yet another embodiment of the present invention.

FIG. 12 is a schematic block diagram of an apparatus 1200 for controlling data transmission according to an embodiment of the present invention as explained from the perspective of a station. As shown in FIG. 12, the apparatus 1200 includes:

a receiving unit 1210, configured to receive a first beacon frame including a traffic indication map TIM, where a second field in at least one block in the TIM carries fourth indication information, and the fourth indication information is used for indicating the number of stations, which need to transmit data, of stations indicated by blocks in the TIM;

an acquiring unit 1220, configured to acquire the fourth indication information from the second field; and a determining unit 1230, configured to determine, according to the fourth indication information, the number of stations, which need to transmit data, of the stations indicated by the blocks in the TIM.

Therefore, by adding one field into at least one block in an existing TIM, the station can rapidly and conveniently learn the number of stations that need to send data within a period of a current beacon frame.

The apparatus 1200 for controlling data transmission according to the embodiment of the present invention may correspond to the implementation body (the station) of the method 1000 according to the embodiment of the present invention, and the units in the apparatus 1200 for controlling data transmission and the foregoing other operations and/or functions are used to implement corresponding procedures in the method 1000 separately, which are no longer elaborated herein for simplicity.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected as required to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for controlling data transmission, the method comprising:
    determining a station that needs to transmit data within a sending period of a first beacon frame as a first station, wherein the first beacon frame comprises a first indication information for indicating at least one first backoff duration and a traffic indication map (TIM); and
    sending the first beacon frame to the first station to enable the first station to:
        determine, according to the TIM comprised in the first beacon frame, that data needs to be transmitted within the sending period of the first beacon frame,
        acquire the first indication information from the first beacon frame, and
        perform a data transmission operation by using the first backoff duration indicated by the first indication information.

2. The method according to claim 1, wherein:
    a statistical average value of the first backoff duration used by the first station to perform a data transmission operation is less than a statistical average value of a second backoff duration used by a second station to perform a data transmission operation; or
    a statistical average value of the first backoff duration used by the first station to perform a data transmission operation is greater than a statistical average value of the second backoff duration used by the second station to perform a data transmission operation.

3. The method according to claim 1, further comprising:
    sending third indication information to the first station by using the first beacon frame for indicating whether a station that needs to transmit data within the sending period of the first beacon frame exists in stations indicated by blocks in the TIM, and the third indication information is carried in a first field in a page in the TIM.

4. An apparatus for controlling data transmission, the apparatus comprising:
    a processor configured to determine a station that needs to transmit data within a sending period of a first beacon frame as a first station, wherein the first beacon frame comprises a first indication information and a traffic indication map TIM; and
    a transmitter configured to send the first beacon frame to the first station to enable the first station:
        determine, according to a traffic indication map (TIM) comprised in the first beacon frame, that data needs to be transmitted within the sending period of the first beacon frame, and
        acquire the first indication information from the first beacon frame.

5. The apparatus according to claim 4, wherein:
    a statistical average value of the first backoff duration that is indicated by the first indication information sent by the sending unit and is used by the first station to perform a data transmission operation is less than a statistical average value of the second backoff duration used by the second station to perform a data transmission operation; or
    a statistical average value of the first backoff duration that is indicated by the first indication information sent by the sending unit and is used by the first station to perform a data transmission operation is greater than a statistical average value of the second backoff duration used by the second station to perform a data transmission operation.

6. The apparatus according to claim 4, wherein the transmitter is further configured to send third indication information to the first station by using the first beacon frame for indicating whether a station that needs to transmit data within the sending period of the first beacon frame exists in stations indicated by blocks in the TIM, and the third indication information is carried in a first field in a page in the TIM.

7. An apparatus for controlling data transmission, the apparatus comprising:
   an acquiring unit, configured to enable a first station to acquire a first beacon frame, wherein the first beacon frame comprises a first indication information for indicating at least one first backoff duration and a traffic indication map (TIM);
   a determining unit, configured to determine the first backoff duration according to the first indication information; and
   an operation unit, configured to perform a data transmission operation by using the first backoff duration.

8. The apparatus according to claim 7, wherein:
   a statistical average value of the first backoff duration that is indicated by the first indication information acquired by the acquiring unit and is used by the first station to perform a data transmission operation is less than a statistical average value of the second backoff duration used by the second station to perform a data transmission operation; or
   a statistical average value of the first backoff duration that is indicated by the first indication information acquired by the acquiring unit and is used by the first station to perform a data transmission operation is greater than a statistical average value of the second backoff duration used by the second station to perform a data transmission operation.

9. The apparatus according to claim 7, wherein the acquiring unit is further configured to:
   acquire third indication information from a first field in a page in the TIM comprised in the first beacon frame for indicating whether a station that needs to transmit data within the sending period of the first beacon frame exists in stations indicated by blocks in the TIM; and
   the determining unit is further configured to:
   determine, according to the third indication information and the TIM, that data needs to be transmitted within the sending period of the first beacon frame, or
   determine, according to the third indication information, that no data needs to be transmitted within the sending period of the first beacon frame.

10. A method for controlling data transmission, the method comprising:
    receiving a first beacon frame that is sent by an access point, wherein the first beacon frame comprises a first indication information and a traffic indication map (TIM);
    acquiring, by a first station, the first indication information for indicating at least one first backoff duration;
    determining the first backoff duration according to the first indication information;
    determining, according to the TIM comprised in the first beacon frame, that data needs to be transmitted within a sending period of the first beacon frame; and
    performing a data transmission operation by using the first backoff duration.

11. The method according to claim 10, further comprising:
    acquiring third indication information from a first field in a page in the TIM comprised in the first beacon frame, for indicating whether a station that needs to transmit data within the sending period of the first beacon frame exists in stations indicated by blocks in the TIM.

12. The method according to claim 10, wherein:
    a statistical average value of the first backoff duration used by the first station to perform a data transmission operation is less than a statistical average value of a second backoff duration used by the second station to perform a data transmission operation; or
    a statistical average value of the first backoff duration used by the first station to perform a data transmission operation is greater than a statistical average value of the second backoff duration used by the second station to perform a data transmission operation.

* * * * *